(12) United States Patent
Nakajima et al.

(10) Patent No.: US 9,129,645 B2
(45) Date of Patent: Sep. 8, 2015

(54) DATA DEMODULATION DEVICE, DATA DEMODULATION METHOD, REPRODUCTION DEVICE FOR MAGNETICALLY RECORDED DATA, AND PROGRAM

(71) Applicant: NIDEC SANKYO CORPORATION, Nagano (JP)

(72) Inventors: Shigeo Nakajima, Nagano (JP); Yoichi Isono, Nagano (JP); Katsuhisa Higashi, Nagano (JP)

(73) Assignee: NIDEC SANKYO CORPORATION (JP)

( * ) Notice: Subject to any disclaimer, the term of this patent is extended or adjusted under 35 U.S.C. 154(b) by 0 days.

(21) Appl. No.: 14/389,607

(22) PCT Filed: Aug. 26, 2013

(86) PCT No.: PCT/JP2013/072715
§ 371 (c)(1),
(2) Date: Sep. 30, 2014

(87) PCT Pub. No.: WO2014/034600
PCT Pub. Date: Mar. 6, 2014

(65) Prior Publication Data
US 2015/0170705 A1    Jun. 18, 2015

(30) Foreign Application Priority Data

Aug. 30, 2012    (JP) ................. 2012-190229

(51) Int. Cl.
*G11B 5/02*    (2006.01)
*G11B 20/10*    (2006.01)
*G11B 5/008*    (2006.01)

(52) U.S. Cl.
CPC ...... *G11B 20/10037* (2013.01); *G11B 5/00808* (2013.01); *G11B 2220/17* (2013.01)

(58) Field of Classification Search
CPC ..................... G11B 5/59655; G11B 20/10009; G11B 27/36; G11B 20/10527; G11B 20/1426; G11B 27/3027; G11B 15/20; G11B 2220/90
USPC ........... 360/23, 25, 29, 31, 32, 39, 40, 48, 49, 360/51, 53, 54
See application file for complete search history.

(56) References Cited

U.S. PATENT DOCUMENTS 7,339,872 B2 *    3/2008    Ogura .................. 369/59.22

FOREIGN PATENT DOCUMENTS

JP    58-50611 A    3/1983
JP    2001-135034 A    5/2001

(Continued)

OTHER PUBLICATIONS

International Search Report relating to International Application No. PCT/JP2013/072715; Date of Mailing: Oct. 1, 2013; 4 Pages, with English translation.

*Primary Examiner* — Nabil Hindi
(74) *Attorney, Agent, or Firm* — Cantor Colburn LLP

(57) ABSTRACT

A data demodulation method may include converting an analog signal into a digital signal; detecting a peak point of a reproduced signal; creating a plurality of preliminary data rows for creating demodulated data; and creating demodulated data. The preliminary data rows may include the first individual data to be identified on the basis of the interval, and are formed of the first individual data of plural bits. Creating a plurality of preliminary data rows may use a template listing part of, or all of, a plurality of bit patterns being formed of second individual data.

9 Claims, 15 Drawing Sheets

(56) References Cited

FOREIGN PATENT DOCUMENTS

| JP | 2002-150717 | A | 5/2002 |
| JP | 2011-70731 | A | 4/2011 |
| JP | 2013-25852 | A | 2/2013 |

\* cited by examiner

FIG. 5

| PRELIMINARY DATA ROW | 5-BIT FIRST INDIVIDUAL DATA FSPD | | | | |
|---|---|---|---|---|---|
| PDS1 | 0 | 0 | 0 | 0 | 0 |
| PDS2 | 0 | 0 | 0 | 0 | 1 |
| PDS3 | 0 | 0 | 0 | 1 | 1 |
| PDS4 | 0 | 0 | 1 | 1 | 0 |
| PDS5 | 0 | 1 | 1 | 0 | 0 |
| PDS6 | 1 | 1 | 0 | 0 | 0 |
| PDS7 | 1 | 0 | 0 | 0 | 1 |
| PDS8 | 0 | 0 | 0 | 1 | 1 |
| PDS9 | 0 | 0 | 1 | 1 | 1 |
| PDS10 | 0 | 1 | 1 | 1 | 1 |
| PDS11 | 1 | 1 | 1 | 1 | 0 |
| PDS12 | 1 | 1 | 1 | 0 | 0 |
| PDS13 | 1 | 1 | 0 | 0 | 0 |
| PDS14 | 1 | 0 | 0 | 0 | 0 |
| PDS15 | 0 | 0 | 0 | 0 | 0 |

| | DTMIV1 | DTMIV2 | DTMIV3 | DTMIV4 | DTMIV5 | SUM OF ABSOLUTE VALUES OF DIFFERENCES Σ |
|---|---|---|---|---|---|---|
| INTERVALS FOR JUDGMENT | 441 | 278 | 338 | 631 | 637 | |
| BIT PATTERN BPT1 → SSPD1 | | | | | | |
| STANDARD INTERVALS RIV1 | 681 | 681 | 681 | 681 | 681 | |
| ABSOLUTE VALUES OF DIFFERENCES BETWEEN STANDARD INTERVALS AND INTERVALS FOR JUDGMENT | 240 | 403 | 343 | 50 | 44 | 1080 |
| VALUES OBTAINED BY MULTIPLYING ABSOLUTE VALUES OF DIFFERENCES BETWEEN SECOND STANDARD INTERVAL SRIV' AND INTERVALS FOR JUDGMENT DTMIV', BY COEFFICIENT β (1.5) | | | | | | |
| BIT PATTERN BPT2 → SSPD2 | "1" | "1" | "0" | "0" | "0" | |
| STANDARD INTERVALS RIV2 | 340.5 | 340.5 | 681 | 681 | 681 | |
| ABSOLUTE VALUES OF DIFFERENCES BETWEEN STANDARD INTERVALS AND INTERVALS FOR JUDGMENT | 100.5 | 62.5 | 343 | 50 | 44 | 681.5 |
| VALUES OBTAINED BY MULTIPLYING ABSOLUTE VALUES OF DIFFERENCES BETWEEN SECOND STANDARD INTERVAL SRIV' AND INTERVALS FOR JUDGMENT DTMIV', BY COEFFICIENT β (1.5) | 150.75 | 93.75 | 343 | 50 | 44 | |
| BIT PATTERN BPT3 → SSPD3 | "0" | "1" | "1" | "0" | "0" | |
| STANDARD INTERVALS RIV3 | 681 | 340.5 | 340.5 | 681 | 681 | |
| ABSOLUTE VALUES OF DIFFERENCES BETWEEN STANDARD INTERVALS AND INTERVALS FOR JUDGMENT | 240 | 62.5 | 2.5 | 50 | 44 | 431.5 |
| VALUES OBTAINED BY MULTIPLYING ABSOLUTE VALUES OF DIFFERENCES BETWEEN SECOND STANDARD INTERVAL SRIV' AND INTERVALS FOR JUDGMENT DTMIV', BY COEFFICIENT β (1.5) | 240 | 93.75 | 3.75 | 50 | 44 | |
| BIT PATTERN BPT4 → SSPD4 | "0" | "0" | "1" | "1" | "0" | |
| STANDARD INTERVALS RIV4 | 681 | 681 | 340.5 | 340.5 | 681 | |
| ABSOLUTE VALUES OF DIFFERENCES BETWEEN STANDARD INTERVALS AND INTERVALS FOR JUDGMENT | 240 | 403 | 2.5 | 290.5 | 44 | 1126.5 |
| VALUES OBTAINED BY MULTIPLYING ABSOLUTE VALUES OF DIFFERENCES BETWEEN SECOND STANDARD INTERVAL SRIV' AND INTERVALS FOR JUDGMENT DTMIV', BY COEFFICIENT β (1.5) | 240 | 403 | 3.75 | 435.75 | 44 | |
| BIT PATTERN BPT5 → SSPD5 | "0" | "0" | "0" | "1" | "1" | |
| STANDARD INTERVALS RIV5 | 681 | 681 | 681 | 340.5 | 340.5 | |
| ABSOLUTE VALUES OF DIFFERENCES BETWEEN STANDARD INTERVALS AND INTERVALS FOR JUDGMENT | 240 | 403 | 343 | 290.5 | 296.5 | 728 |
| VALUES OBTAINED BY MULTIPLYING ABSOLUTE VALUES OF DIFFERENCES BETWEEN SECOND STANDARD INTERVAL SRIV' AND INTERVALS FOR JUDGMENT DTMIV', BY COEFFICIENT β (1.5) | 240 | 403 | 343 | 435.75 | 444.75 | |
| BIT PATTERN BPT6 → SSPD6 | "1" | "0" | "0" | "1" | "1" | |
| STANDARD INTERVALS RIV6 | 340.5 | 681 | 681 | 340.5 | 340.5 | |
| ABSOLUTE VALUES OF DIFFERENCES BETWEEN STANDARD INTERVALS AND INTERVALS FOR JUDGMENT | 100.5 | 403 | 343 | 290.5 | 296.5 | 1480.75 |
| VALUES OBTAINED BY MULTIPLYING ABSOLUTE VALUES OF DIFFERENCES BETWEEN SECOND STANDARD INTERVAL SRIV' AND INTERVALS FOR JUDGMENT DTMIV', BY COEFFICIENT β (1.5) | 150.75 | 403 | 343 | 435.75 | 444.75 | |
| BIT PATTERN BPT7 → SSPD7 | "1" | "1" | "0" | "1" | "1" | |
| STANDARD INTERVALS RIV7 | 340.5 | 340.5 | 681 | 340.5 | 340.5 | |
| ABSOLUTE VALUES OF DIFFERENCES BETWEEN STANDARD INTERVALS AND INTERVALS FOR JUDGMENT | 100.5 | 62.5 | 343 | 290.5 | 296.5 | 1082.25 |
| VALUES OBTAINED BY MULTIPLYING ABSOLUTE VALUES OF DIFFERENCES BETWEEN SECOND STANDARD INTERVAL SRIV' AND INTERVALS FOR JUDGMENT DTMIV', BY COEFFICIENT β (1.5) | 150.75 | 93.75 | 343 | 435.75 | 444.75 | |

FIG. 7

| FIG. 7A |
|---|
| FIG. 7B |

FIG. 7B

| | INTERVALS FOR JUDGMENT | | | | | SUM OF ABSOLUTE VALUES OF DIFFERENCES Σ |
|---|---|---|---|---|---|---|
| | DTMIV1 | DTMIV2 | DTMIV3 | DTMIV4 | DTMIV5 | |
| BIT PATTERN BPT8 → SSPD8 | 441 | 278 | 338 | 631 | 637 | |
| STANDARD INTERVALS RIV8 | 681 | 340.5 | 340.5 | 681 | 340.5 | |
| ABSOLUTE VALUES OF DIFFERENCES BETWEEN STANDARD INTERVALS AND INTERVALS FOR JUDGMENT | 240 | 62.5 | 2.5 | 50 | 296.5 | 832.25 |
| VALUES OBTAINED BY MULTIPLYING ABSOLUTE VALUES OF DIFFERENCES BETWEEN SECOND STANDARD INTERVAL 'SRV' AND INTERVALS FOR JUDGMENT 'DTMIV', BY COEFFICIENT β (1.5) | 240 | 93.75 | 3.75 | 50 | 444.75 | |
| BIT PATTERN BPT9 → SSPD9 | "0" | "0" | "0" | "1" | "1" | |
| STANDARD INTERVALS RIV9 | 681 | 681 | 681 | 340.5 | 340.5 | |
| ABSOLUTE VALUES OF DIFFERENCES BETWEEN STANDARD INTERVALS AND INTERVALS FOR JUDGMENT | 240 | 403 | 343 | 290.5 | 296.5 | 1866.5 |
| VALUES OBTAINED BY MULTIPLYING ABSOLUTE VALUES OF DIFFERENCES BETWEEN SECOND STANDARD INTERVAL 'SRV' AND INTERVALS FOR JUDGMENT 'DTMIV', BY COEFFICIENT β (1.5) | 240 | 403 | 343 | 435.75 | 444.75 | |
| BIT PATTERN BPT10 → SSPD10 | "0" | "0" | "0" | "1" | "1" | |
| STANDARD INTERVALS RIV10 | 340.5 | 340.5 | 681 | 340.5 | 340.5 | |
| ABSOLUTE VALUES OF DIFFERENCES BETWEEN STANDARD INTERVALS AND INTERVALS FOR JUDGMENT | 100.5 | 62.5 | 343 | 290.5 | 296.5 | 1468 |
| VALUES OBTAINED BY MULTIPLYING ABSOLUTE VALUES OF DIFFERENCES BETWEEN SECOND STANDARD INTERVAL 'SRV' AND INTERVALS FOR JUDGMENT 'DTMIV', BY COEFFICIENT β (1.5) | 150.75 | 93.75 | 343 | 435.75 | 444.75 | |
| BIT PATTERN BPT11 → SSPD11 | "0" | "1" | "1" | "1" | "1" | |
| STANDARD INTERVALS RIV11 | 681 | 681 | 340.5 | 340.5 | 340.5 | |
| ABSOLUTE VALUES OF DIFFERENCES BETWEEN STANDARD INTERVALS AND INTERVALS FOR JUDGMENT | 240 | 403 | 2.5 | 290.5 | 296.5 | 1527.25 |
| VALUES OBTAINED BY MULTIPLYING ABSOLUTE VALUES OF DIFFERENCES BETWEEN SECOND STANDARD INTERVAL 'SRV' AND INTERVALS FOR JUDGMENT 'DTMIV', BY COEFFICIENT β (1.5) | 240 | 403 | 3.75 | 435.75 | 444.75 | |
| BIT PATTERN BPT12 → SSPD12 | "1" | "1" | "1" | "1" | "1" | |
| STANDARD INTERVALS RIV12 | 681 | 340.5 | 340.5 | 340.5 | 340.5 | |
| ABSOLUTE VALUES OF DIFFERENCES BETWEEN STANDARD INTERVALS AND INTERVALS FOR JUDGMENT | 240 | 62.5 | 2.5 | 290.5 | 296.5 | 1218 |
| VALUES OBTAINED BY MULTIPLYING ABSOLUTE VALUES OF DIFFERENCES BETWEEN SECOND STANDARD INTERVAL 'SRV' AND INTERVALS FOR JUDGMENT 'DTMIV', BY COEFFICIENT β (1.5) | 240 | 93.75 | 3.75 | 435.75 | 444.75 | |
| BIT PATTERN BPT13 → SSPD13 | "1" | "1" | "1" | "1" | "1" | |
| STANDARD INTERVALS RIV13 | 340.5 | 340.5 | 340.5 | 340.5 | 340.5 | |
| ABSOLUTE VALUES OF DIFFERENCES BETWEEN STANDARD INTERVALS AND INTERVALS FOR JUDGMENT | 100.5 | 62.5 | 2.5 | 290.5 | 296.5 | 1128.75 |
| VALUES OBTAINED BY MULTIPLYING ABSOLUTE VALUES OF DIFFERENCES BETWEEN SECOND STANDARD INTERVAL 'SRV' AND INTERVALS FOR JUDGMENT 'DTMIV', BY COEFFICIENT β (1.5) | 150.75 | 93.75 | 3.75 | 435.75 | 444.75 | |

FIG. 7

| FIG. 7A |
|---|
| FIG. 7B |

FIG. 8

| BIT PATTERN PTN | | | | | |
|---|---|---|---|---|---|
| PTN0 | 0 | 0 | 0 | 0 | 0 |
| PTN1 | 0 | 0 | 0 | 0 | 1 |
| PTN2 | 0 | 0 | 0 | 1 | 0 |
| PTN3 | 0 | 0 | 0 | 1 | 1 |
| PTN4 | 0 | 0 | 1 | 0 | 0 |
| PTN5 | 0 | 0 | 1 | 0 | 1 |
| PTN6 | 0 | 0 | 1 | 1 | 0 |
| PTN7 | 0 | 0 | 1 | 1 | 1 |
| PTN8 | 0 | 1 | 0 | 0 | 0 |
| PTN9 | 0 | 1 | 0 | 0 | 1 |
| PTN10 | 0 | 1 | 0 | 1 | 0 |
| PTN11 | 0 | 1 | 0 | 1 | 1 |
| PTN12 | 0 | 1 | 1 | 0 | 0 |
| PTN13 | 0 | 1 | 1 | 0 | 1 |
| PTN14 | 0 | 1 | 1 | 1 | 0 |
| PTN15 | 0 | 1 | 1 | 1 | 1 |
| PTN16 | 1 | 0 | 0 | 0 | 0 |
| PTN17 | 1 | 0 | 0 | 0 | 1 |
| PTN18 | 1 | 0 | 0 | 1 | 0 |
| PTN19 | 1 | 0 | 0 | 1 | 1 |
| PTN20 | 1 | 0 | 1 | 0 | 0 |
| PTN21 | 1 | 0 | 1 | 0 | 1 |
| PTN22 | 1 | 0 | 1 | 1 | 0 |
| PTN23 | 1 | 0 | 1 | 1 | 1 |
| PTN24 | 1 | 1 | 0 | 0 | 0 |
| PTN25 | 1 | 1 | 0 | 0 | 1 |
| PTN26 | 1 | 1 | 0 | 1 | 0 |
| PTN27 | 1 | 1 | 0 | 1 | 1 |
| PTN28 | 1 | 1 | 1 | 0 | 0 |
| PTN29 | 1 | 1 | 1 | 0 | 1 |
| PTN30 | 1 | 1 | 1 | 1 | 0 |
| PTN31 | 1 | 1 | 1 | 1 | 1 |

FIG. 9

| 220 | | PDS5 | PDS6 | PDS7 | PDS8 | PDS9 | PDS10 | PDS11 | PDS12 | PDS13 | PDS14 | PDS15 |
|---|---|---|---|---|---|---|---|---|---|---|---|---|
| DATA STORAGE UNIT(9) | INTERVALS FOR JUDGMENT DTMMIV5 | t9 | t10 | t11 | t12 | t13 | t14 | t15 | t16 | t17 | t18 | t19 |
| DATA STORAGE UNIT(8) | INTERVALS FOR JUDGMENT DTMMIV4 | t8 | t9 | t10 | t11 | t12 | t13 | t14 | t15 | t16 | t17 | t18 |
| DATA STORAGE UNIT(7) | INTERVALS FOR JUDGMENT DTMMIV3 | t7 | t8 | t9 | t10 | t11 | t12 | t13 | t14 | t15 | t16 | t17 |
| DATA STORAGE UNIT(6) | INTERVALS FOR JUDGMENT DTMMIV2 | t6 | t7 | t8 | t9 | t10 | t11 | t12 | t13 | t14 | t15 | t16 |
| DATA STORAGE UNIT(5) | INTERVALS FOR JUDGMENT DTMMIV1 | t5 | t6 | t7 | t8 | t9 | t10 | t11 | t12 | t13 | t14 | t15 |
| DATA STORAGE UNIT(4) | INTERVALS FOR CALCULATION CALIV4 | t4 | t5 | t6 | t7 | t8 | t9 | t10 | t11 | t12 | t13 | t14 |
| DATA STORAGE UNIT(3) | INTERVALS FOR CALCULATION CALIV3 | t3 | t4 | t5 | t6 | t7 | t8 | t9 | t10 | t11 | t12 | t13 |
| DATA STORAGE UNIT(2) | INTERVALS FOR CALCULATION CALIV2 | t2 | t3 | t4 | t5 | t6 | t7 | t8 | t9 | t10 | t11 | t12 |
| DATA STORAGE UNIT(1) | INTERVALS FOR CALCULATION CALIV1 | t1 | t2 | t3 | t4 | t5 | t6 | t7 | t8 | t9 | t10 | t11 |
| DATA STORAGE UNIT(0) | | t0 | t1 | t2 | t3 | t4 | t5 | t6 | t7 | t8 | t9 | t10 |

FIG. 10

| | PATTERN A | PATTERN B | PATTERN C | PATTERN D | PATTERN E | PATTERN F | PATTERN G |
|---|---|---|---|---|---|---|---|
| FIRST INDIVIDUAL DATA IN RELATION TO INTERVALS FOR CALCULATION 'CALIV4' SPD4 | 0 | 0 | 1 | 1 | 1 | 1 | 1 |
| FIRST INDIVIDUAL DATA IN RELATION TO INTERVALS FOR CALCULATION 'CALIV3' SPD3 | 0 | 1 | 0 | 0 | 1 | 1 | 1 |
| FIRST INDIVIDUAL DATA IN RELATION TO INTERVALS FOR CALCULATION 'CALIV2' SPD2 | × | × | 0 | 1 | 1 | 1 | 0 |
| FIRST INDIVIDUAL DATA IN RELATION TO INTERVALS FOR CALCULATION 'CALIV1' SPD1 | × | × | × | × | 0 | 1 | × |

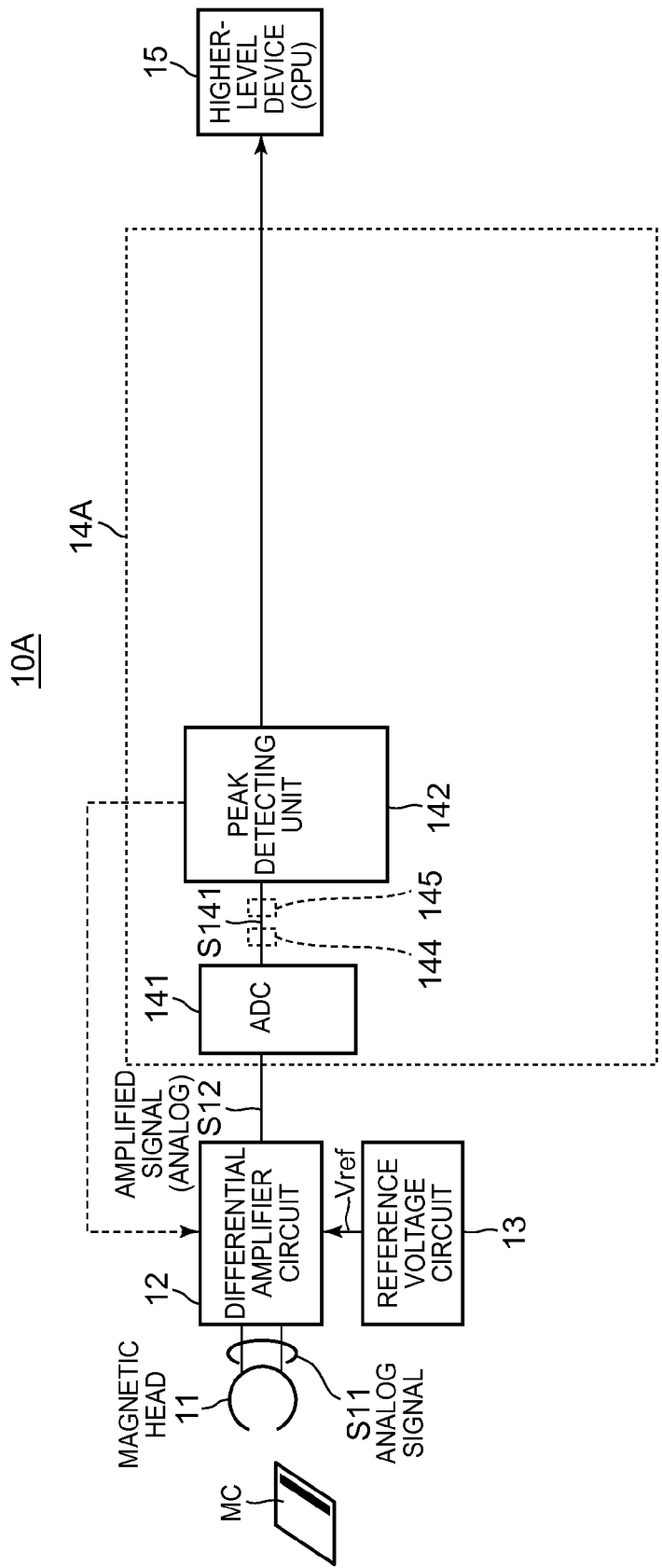

DATA DEMODULATION DEVICE, DATA DEMODULATION METHOD, REPRODUCTION DEVICE FOR MAGNETICALLY RECORDED DATA, AND PROGRAM

CROSS REFERENCE TO RELATED APPLICATIONS

This is the U.S. national stage of International Application No. PCT/JP2013/072715, filed on Aug. 26, 2013. Priority under 35 U.S.C. §119(a) and 35 U.S.C. §365(b) is claimed from Japanese Application No. 2012-190229, filed Aug. 30, 2012.

FIELD OF THE INVENTION

The present invention relates to a data demodulation device, a data demodulation method, a reproduction device for magnetically recorded data, and a program, for demodulating magnetically recorded data (information) of a recording medium, such as a magnetic card; the magnetically recorded data being recorded according to a predetermined format (modulation method).

BACKGROUND

In a magnetically recorded data reproduction device, such as a magnetic card reader; an "F"&"2F" signal corresponding to a "0"&"1" datum is read out, the "F"&"2F" signal being magnetically-recorded, for example, by means of a frequency modulation method; and then the datum read out, which is frequency-modulated (by F2F modulation), is demodulated by a data demodulation device (demodulation circuit).

Proposed in Patent Document 1 is a demodulation method in which magnetic data recorded in a magnetic recording medium, such as a magnetic card, by means of a frequency modulation method is read out and the data is demodulated.

In the demodulation method described in Patent Document 1, a time period (a standard interval) as a result of multiplying an interval of an adjacent bit positioned one bit before a bit to be judged, by a certain rate (for example, 5/8), and an interval of the bit to be judged are compared each other in order to judge whether a datum of the bit to be judged is "0" or "1."

[Patent Document]

Patent Document 1: Japanese Unexamined Patent Application Publication No. 58-50611*

In the method for demodulation described in Patent Document 1, one standard interval and an interval of a bit to be judged are compared each other in order to make a judgment on a datum of the bit. Therefore, in the case where a transfer speed of a magnetic recording medium fluctuates on a grand scale, or a recording accuracy of magnetic data recorded in a magnetic recording medium is low, unfortunately the magnetic data cannot be demodulated appropriately so that an error happens with a high possibility.

SUMMARY

At least an embodiment of the present invention provides a data demodulation device, a data demodulation method, a magnetically recorded data reproduction device, and a program, by which the magnetic data can appropriately be demodulated with great accuracy even though a transfer speed of a magnetic recording medium fluctuates on a grand scale, or a recording accuracy of the magnetic data recorded in a magnetic recording medium is low.

At least an embodiment of the present invention may include a data demodulation device for demodulating magnetic data that is read out and reproduced from a magnetic recording medium, the data demodulation device comprising: a preliminary data creating unit for creating a plurality of preliminary data rows for creating demodulated data on the basis of an interval corresponding to a time interval between peaks in a reproduced signal of the magnetic data; and a demodulated data creating unit for creating demodulated data on the basis of first individual data constituting the plurality of preliminary data rows that have been created in the preliminary data creating unit; wherein, the preliminary data rows include the first individual data to be identified on the basis of the interval, and are formed of the first individual data of plural bits, and the preliminary data creating unit comprises; a template listing part of, or all of, a plurality of bit patterns being formed of second individual data having the same number of multiple-bit as the number of multiple-bit that the first individual data, forming the preliminary data rows, have; a standard interval identifying unit for identifying a first standard interval and a second standard interval, the first standard interval being the interval as a standard for making a judgment that the first individual data of the preliminary data rows is "0", and the second standard interval being the interval as a standard for making a judgment that the first individual data is "1", according to information of a plurality of the intervals; a standard interval assigning unit for making an assignment to each of the second individual data in the template; namely, assigning the first standard interval to the second individual datum being "0" and assigning the second standard interval to the second individual datum being "1"; a comparison operation unit for making a comparison between a plurality of intervals for judgment as the intervals for identifying the first individual data and either of the first standard interval or the second standard interval, assigned in the template, with respect to each bit pattern as well as each bit of the bit pattern; and a preliminary data identifying unit for identifying the bit pattern corresponding to the preliminary data rows, according to a comparison result by the comparison operation unit, and outputting the identified bit pattern, as the preliminary data row, to the demodulated data creating unit; and the comparison operation unit calculates a first positive value corresponding to a difference between the intervals for judgment and the first standard interval assigned in the template, or a second positive value corresponding to a difference between the intervals for judgment and the second standard interval, with respect to each bit pattern as well as each bit of the bit pattern, and multiplies the second positive value corresponding to the difference between the second standard interval and the intervals for judgment, by a coefficient which is a greater value than that for the first positive value; and the preliminary data identifying unit calculates a sum value that is a sum of the first positive value and/or the second positive value of each bit pattern, wherein the first positive value and the second positive value are calculated for each bit in the comparison operation unit and these values are those after the multiplication by the coefficient, and then the preliminary data identifying unit identifies the bit pattern that gives a minimum of the calculated sum value, as the preliminary data row. Thus, by way of multiplying the second positive value, out of the first positive value and the second positive value, by the coefficient that is greater than that for the first positive value, it is possible to prevent a judgment error from arising in the identifying process for the preliminary data, so that further accurate magnetic data demodulation can be materialized.

At least an embodiment of the present invention may include a data demodulation method for demodulating magnetic data, read out and reproduced from a magnetic recording medium, the data demodulation method comprising: a preliminary data creating step for creating a plurality of preliminary data rows for creating demodulated data on the basis of an interval corresponding to a time interval between peaks in a reproduced signal of the magnetic data; and a demodulated data creating step for creating demodulated data on the basis of first individual data constituting the plurality of preliminary data rows that have been created in the preliminary data creating step; wherein, the preliminary data rows include the first individual data to be identified on the basis of the interval, and are formed of the first individual data of plural bits, and the preliminary data creating step uses; a template listing part of, or all of, a plurality of bit patterns being formed of second individual data having the same number of multiple-bit as the number of multiple-bit that the first individual data, forming the preliminary data rows, have; and the preliminary data creating step comprises; a standard interval identifying step for identifying a first standard interval and a second standard interval, the first standard interval being the interval as a standard for making a judgment that the first individual data of the preliminary data rows is "0", and the second standard interval being the interval as a standard for making a judgment that the first individual data is "1", according to information of a plurality of the intervals; a standard interval assigning step for making an assignment to each of the second individual data in the template; namely, assigning the first standard interval to the second individual datum being "0" and assigning the second standard interval to the second individual datum being "1": a comparison operation step for making a comparison between a plurality of intervals for judgment as the intervals for identifying the first individual data and either of the first standard interval or the second standard interval, assigned in the template, with respect to each bit pattern as well as each bit of the bit pattern; and a preliminary data identifying step for identifying the bit pattern corresponding to the preliminary data rows, according to a comparison result by the comparison operation step, in order to adopt the identified bit pattern as the preliminary data row; and the comparison operation step calculates a first positive value corresponding to a difference between the intervals for judgment and the first standard interval assigned in the template, or a second positive value corresponding to a difference between the intervals for judgment and the second standard interval, with respect to each bit pattern as well as each bit of the bit pattern, and multiplies the second positive value corresponding to the difference between the second standard interval and the intervals for judgment, by a coefficient which is a greater value than that for the first positive value; and the preliminary data identifying step calculates a sum value that is a sum of the first positive value and/or the second positive value of each bit pattern, wherein the first positive value and the second positive value are calculated for each bit in the comparison operation step and these values are those after the multiplication by the coefficient, and then the preliminary data identifying step identifies the bit pattern that gives a minimum of the calculated sum value, as the preliminary data row.

According to at least an embodiment of the present invention, magnetic data can appropriately be demodulated with great accuracy even though a transfer speed of a magnetic recording medium fluctuates on a grand scale, or a recording accuracy of the magnetic data recorded in a magnetic recording medium is low.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 5 is a diagram for explaining a plurality of preliminary data rows created in a preliminary data creating unit in the data demodulation unit according to the present embodiment.

FIG. 7 is a diagram for explaining a template saved in the preliminary data creating unit according to the present embodiment.

FIG. 8 is a diagram showing 5-bit bit patterns.

FIG. 9 is a diagram for explaining storage status of intervals stored in a data storage unit of the preliminary data creating unit according to the present embodiment.

FIG. 10 is a diagram for explaining a method of identifying a standard interval in a standard interval identifying unit according to the present embodiment.

FIG. 14 is a block diagram showing a configuration example of a magnetically recorded data reproduction device according to a second embodiment of the present invention.

DESCRIPTION OF THE PREFERRED EMBODIMENTS

Embodiments of the present invention are explained below with reference to the accompanying drawings.

First Embodiment

Figure 1:
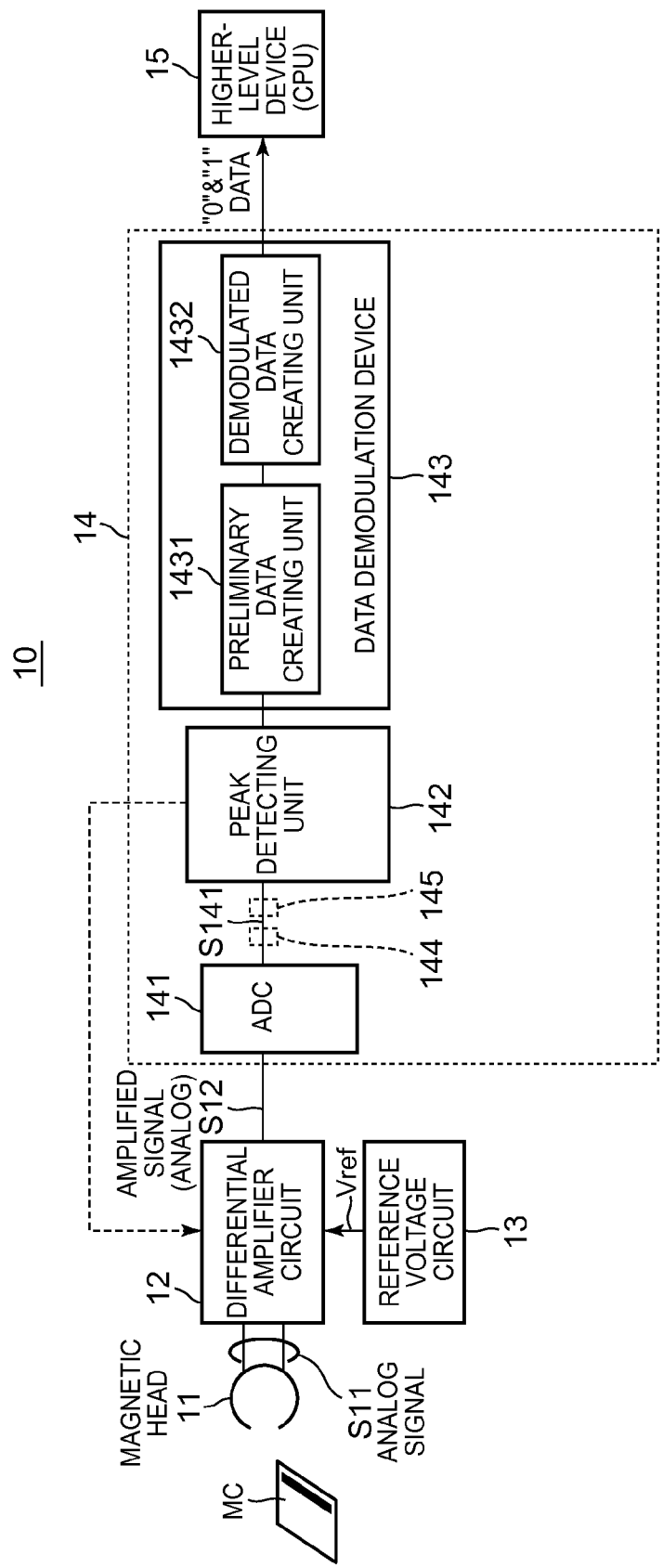
FIG. 1 is a block diagram showing a configuration example of a magnetically recorded data reproduction device according to a first embodiment of the present invention.
Figure 2:
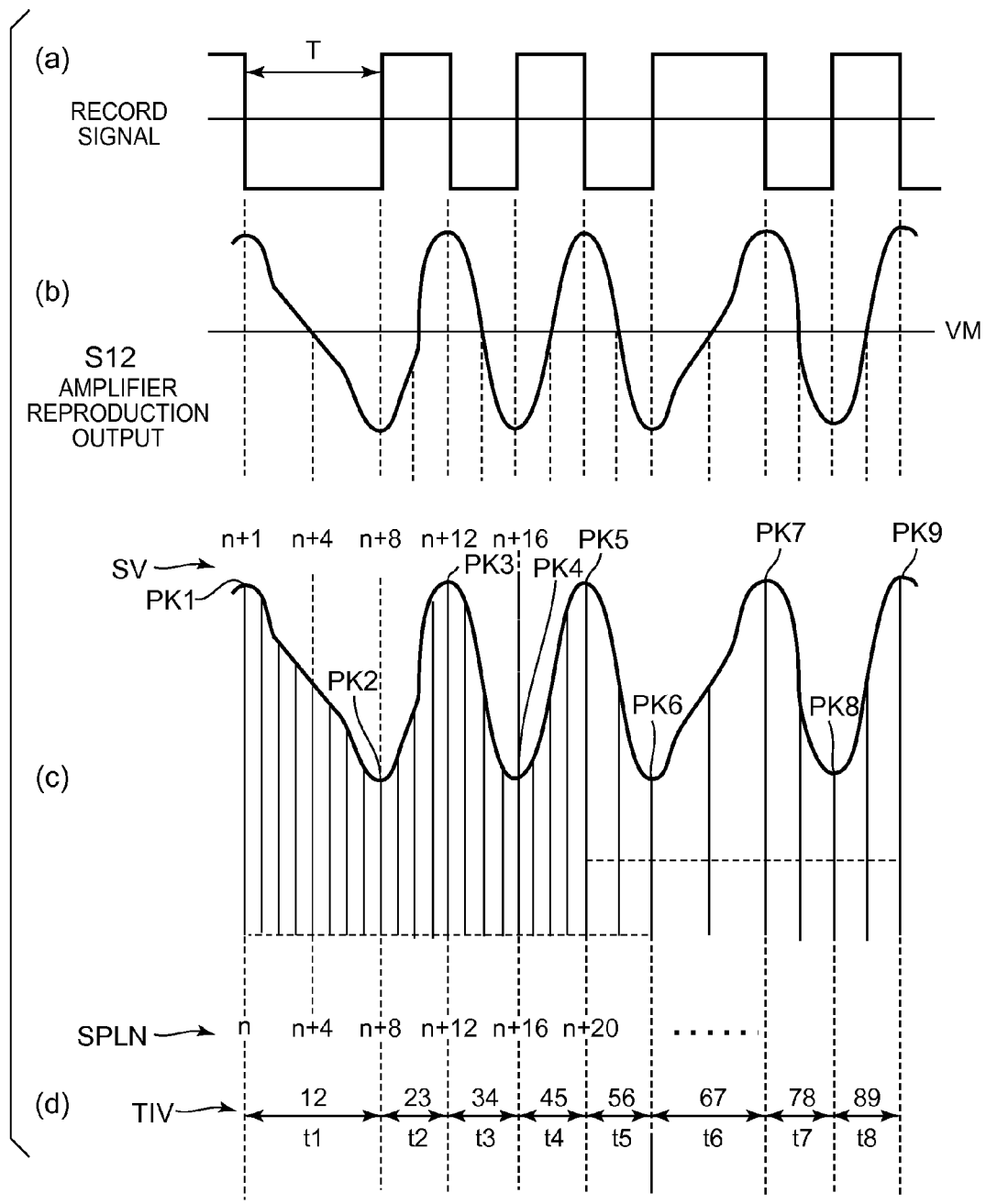
FIG. 2 includes diagrams showing signal processing waveforms in substantial sections of the magnetically recorded data reproduction device of FIG. 1.

FIG. 1 is a block diagram showing a configuration example of a magnetically recorded data reproduction device according to a first embodiment of the present invention. FIG. 2 includes diagrams showing signal processing waveforms in substantial sections of the magnetically recorded data reproduction device of FIG. 1.

In the present embodiment, the magnetically recorded data reproduction device applicable to a magnetic card reader for reproducing information recorded in a magnetic card etc., as a recording medium, is explained as an example of a device to which a data demodulation device for demodulating a magnetic datum frequency-modulated is applied. Moreover, in the present embodiment, explained as an example is a case in which an "F"&"2F" signal corresponding to a "0"&"1" datum is read and reproduced, the "F"&"2F" signal being magnetically-recorded by means of a frequency modulation method. Nevertheless, the present technology can be applied, not only to an F2F method, but also to various other methods, such as an F3F method, an NRZI method, and MFM method, and the like.

As shown in FIG. 1, a magnetically recorded data reproduction device 10 is configured in such a way as to include a magnetic head 11, a differential amplifier circuit 12, a reference voltage circuit 13, a digital reproduction processing circuit 14, and a higher-level device (CPU) 15. The digital reproduction processing circuit 14 of the first embodiment includes: an analog/digital converter (AD converter: ADC) 141, a peak detecting unit 142, and a data demodulation device (demodulation circuit) 143.

The magnetically recorded data reproduction device 10 according to the present embodiment obtains interval information corresponding to a time interval between peaks in a reproduced signal, by use of the peak detecting unit 142 in the digital reproduction processing circuit 14. Then, in the data demodulation device 143, a plurality of preliminary data rows for creating demodulated data are created on the basis of the interval information obtained, and the demodulated data is created on the basis of first individual data constituting the plurality of preliminary data rows that have been created. In the present embodiment, the data demodulation device 143 calculates an absolute value of a difference between an interval for judgment DTMIV and either of a first standard interval FRIV or a second standard interval SRIV, assigned in a template, with respect to each bit pattern BPT as well as each bit of the bit pattern BPT. The data demodulation device 143 obtains, for example, a second correction value AMV2 as a result of correcting a second absolute value ABV2, as well as a first correction value AMV1 as a result of correcting a first absolute value ABV1 (including a value as a result of multiplying by 1 as well), by way of multiplying a second positive value (for example, an absolute value or a square value) tailored to the difference between the second standard interval SRIV and the interval for judgment DTMIV, by a weighting coefficient β which is a greater value than that for a first positive value (an absolute value or a square value). Then, the data demodulation device 143 calculates, for example, a sum value Σ, which is a sum of the first absolute value ABV1 and/or the second absolute value ABV2 of each bit pattern BPT, wherein the first absolute value ABV1 and the second absolute value ABV2 are calculated for each bit and these values are those after the multiplication by the coefficient; and the data demodulation device 143 identifies a bit pattern BPT that gives a minimum of the calculated sum value Σ, as a preliminary data row. In this context, "the first absolute value ABV1 and/or the second absolute value ABV2" means that a bit pattern including both of the first absolute value and the second absolute value, a bit pattern including only the first absolute value, and a bit pattern including the second absolute value multiplied by the coefficient are collectively included. In the present embodiment, for example, the second absolute value of both the first absolute value and the second absolute value is multiplied by a coefficient which is greater than that for the first absolute value, in order to prevent a misjudgment from happening in a process of identifying a preliminary data row, so that a magnetic data is demodulated further accurately. A peak detection process in the peak detecting unit 142 and a data demodulation process in the data demodulation device 143 are explained later in detail.

The magnetic head 11 reads out a magnetic record datum as an analog signal, the magnetic record datum being recorded in a magnetic card MC as a magnetic recording medium by means of the F2F modulation method, for example as shown in FIG. 2A.

For example, the magnetic card MC is a rectangular-shaped PVC card having a thickness of around 0.7 to 0.8 mm. Formed in the magnetic card MC is a magnetic stripe in which magnetic data is recorded. Incidentally, in the card, an IC chip may be placed and/or an antenna for data communication may be embedded. Moreover, the magnetic card MC may be a PET (polyethylene terephthalate) card having a thickness of around 0.18 to 0.36 mm, or it may be a paper card and the like having a predetermined thickness.

Being configured with an operation amplifier, the differential amplifier circuit 12 amplifies an analog signal S11, which has been read out with the magnetic head 11 and reproduced, up to an adequate level; and then outputs an amplified analog signal S12, as shown in FIG. 2B, to the AD converter 141 of the digital reproduction processing circuit 14. In the differential amplifier circuit 12, an intermediate value VM of the output analog signal S12 is set up in accordance with a reference voltage Vref supplied by the reference voltage circuit 13.

Moreover, the differential amplifier circuit 12 can also be configured in such a way as to have a function for auto gain control (AGC). For example, as shown with a dotted line in FIG. 1, it is possible to configure the circuit in such a way as to control a gain of the differential amplifier circuit 12 in accordance with peak detection information at the peak detecting unit 142 of the digital reproduction processing circuit 14. In this case, the differential amplifier circuit 12 differentially-amplifies the analog signal S11 reproduced by the magnetic head 11 up to a level according to the peak detection information at the peak detecting unit 142 of the digital reproduction processing circuit 14. The differential amplifier circuit 12 carries out the gain control to set up the amplitude of a signal, for example, into a quarter of a full range.

The reference voltage circuit 13 supplies the differential amplifier circuit 12 with the reference voltage Vref to be set up as the intermediate value VM of an output level of the differential amplifier circuit 12.

The AD converter 141 converts the analog signal S12 amplified by the differential amplifier circuit 12, into a digital signal, and outputs the digital signal as a signal S141 to the peak detecting unit 142. The AD converter 141 converts the analog signal S12 amplified by the differential amplifier circuit 12, into the digital signal by way of sampling at a certain frequency; for example, at 300 kHz; and outputs it as the signal S141 to the peak detecting unit 142. In other words, the AD converter 141 converts the analog signal, reproduced by the magnetic head 11, into the digital signal by way of sampling at each predetermined time.

As shown in FIG. 2C, the AD converter 141 carries out sampling at each sampling point (at each timing); shown with sampling numbers, such as SPLN(n+1), - - -, (n+4), - - -. The sampling numbers SPLN are used as positional information in the peak detecting unit 142, at a next step. The positional information includes time-wise information. Then, the AD converter 141 outputs the signal S141, which includes the positional time-wise information composed of the sampling numbers SPLN and a value at each sampling point, such as SV(n+1), - - -, (n+4), - - -, to the peak detecting unit 142.

Receiving the output digital signal S141 from the AD converter 141, the peak detecting unit 142 detects a peak point corresponding to a position of an extreme value (a local maximum value and a local minimum value) in magnetic data.

The peak detecting unit 142 obtains information of a time interval (gap) TIV between peak points calculated according to a plurality of peak-point information sets; and outputs either the information of a time interval TIV or a signal S142, which includes the peak-point information sets and the information of a time interval TIV, to the data demodulation device 143. The information of a time interval TIV as interval information corresponds to time interval information.

The peak detecting unit 142 automatically sets up a detection threshold (judgment level) of a waveform at a time of peak detection, in accordance with an output level of the AD converter 141. This function makes it possible to deal with even a magnetic card having a fluctuated output, without switching over a circuit. Applied in the peak detecting unit 142 is a method in which, for example with respect to a noise card, two peak points exceeding a certain threshold (judgment level) lead to a judgment of existence of a peak point. The detection method for detecting a peak point is described later in detail.

Moreover, as described above, the peak detecting unit 142 calculates time intervals; TIV12 through TIV89 (t1 through t8) - - -, as the time interval information, based on previous-and-next two peak points, as shown in FIGS. 2C and 2D.

In an example shown in FIG. 2, the peak detecting unit 142 calculates a time interval between a peak point PK1 and a peak point PK2, as the time interval TIV12 (t1); calculates a time interval between the peak point PK2 and a peak point PK3, as the time interval TIV23 (t2); calculates a time interval between the peak point PK3 and a peak point PK4, as the time interval TIV34 (t3); calculates a time interval between the peak point PK4 and a peak point PK5, as the time interval TIV45 (t4); calculates a time interval between the peak point PK5 and a peak point PK6, as the time interval TIV56 (t5); calculates a time interval between the peak point PK6 and a peak point PK7, as the time interval TIV67 (t6); calculates a time interval between the peak point PK7 and a peak point PK8, as the time interval TIV78 (t7); and calculates a time interval between the peak point PK8 and a peak point PK9, as the time interval TIV89 (t8).

The peak detecting unit 142 outputs the information of the calculated time intervals TIV12 through TIV89 (t1 through t8), - - - (or, together with the peak-point information sets) to the data demodulation device 143.

(Basic Peak Detection Method of the Peak Detecting Unit 142)

Explained below is a concrete processing example of peak detection in the peak detecting unit 142. The peak detecting unit 142 makes a judgment with respect to the magnetic data, which has been converted by the AD converter 141 so as to be digital data, by using an initial threshold (judgment level) IJLV at first. If a digital value exceeds the judgment level IJLV, it is judged that the point is a peak.

The peak detecting unit 142 calculates a next judgment level JLV by using the previous peak value. Concretely to describe, a digital value of a peak (Max) minus a digital value of a bottom (Min) in a waveform leaves a value; PtoP=Max−Min; and the value PtoP multiplied by a certain ratio, based on the difference, is calculated as a value α (correction value, or level). Then, adding the correction value α or subtracting the correction value α to/from an intermediate value VCT, between the digital value (Max) and the digital value (Min), leaves a value (level) as a judgment level JLV.

$$\text{The judgment level } JLV = VCT \pm PtoP*C = VCT \pm \alpha, \quad \text{(Expression 1)}$$

wherein the 'C' represents a constant, and as an example of the 'C', it is set up as; $C=1/2^n$, for example, $1/2^5=1/32$.

The judgment level is automatically set up according to the expression described above. Thus, it becomes possible to detect a card with a low output as well as a card with a high output. In other words, the peak detecting unit 142 automatically sets up the judgment level (detection threshold) of a waveform at a time of peak detection, in accordance with the output level of the AD converter 141. Thus, it is possible to deal with even a magnetic card having a fluctuated output, without switching over a circuit.

In this way, at the time of determining a peak value, as a general rule the peak detecting unit 142 calculates the correction value α by multiplying the difference between a first peak value of a determination object and a second peak value, located immediately before the first peak value, by a predetermined ratio based on the difference. The judgment level (threshold) JLV is calculated by adding the correction value α or subtracting the correction value α to/from an intermediate value between the first peak value and the second peak value. Then, depending on if a digital value exceeds the judgment level JLV that has been calculated and set up, the peak detecting unit 142 makes a judgment on whether or not the digital value is a peak value.

(More Accurate Peak Detection Method by the Peak Detecting Unit 142)

Moreover, in the present embodiment; for example, with respect to a noise card, the peak detecting unit 142 makes a judgment on whether or not a digital value is a peak value, depending on if not only one peak point but also two peak points exceed a judgment level (threshold). In this case, the peak detecting unit 142 automatically sets up a judgment level (detection threshold, or slice value) JVL and an intermediate value VCT in a difference between peak values, of a waveform at a time of peak detection, in accordance with an output level of the AD converter 141.

At the time of determining a peak value; with respect to a first peak value VP1 of a determination object, the peak detecting unit 142 carries out an arithmetic operation by using a second peak value VP2, located immediately before the first peak value VP1, and a third peak value VP3, located two peak values before the first peak value VP1. For the operation, the peak detecting unit 142 has a function of saving a digital value to be input as required as well as a determined peak value, in a saving unit, not shown, such as a register, a memory device and the like.

The peak detecting unit 142 calculates a first correction value; α1 or α11, by multiplying a difference between the third peak value VP3 and the second peak value VP2: (VP3−VP2), by a predetermined ratio 'C' (=1/2") based on the difference (an absolute value of the difference). At the same time in parallel, the peak detecting unit 142 calculates and sets up a first intermediate value; VCT1 or VCT11, between the second peak value VP2 and the third peak value VP3. Then, the peak detecting unit 142 calculates and sets up a first judgment level (threshold); JVL1 or JVL11, by adding or subtracting the first correction value; α1 or α11, to/from the first intermediate value; VCT1 or VCT11, between the third peak value VP3 and the second peak value VP2. Moreover, the peak detecting unit 142 calculates and sets up a second correction value; α2 or α12, by multiplying a difference between the second peak value VP2 and the first peak value VP1: (VP2−VP1), by a predetermined ratio 'C' (=1/2") based on the difference. At the same time in parallel, the peak detecting unit 142 calculates and sets up a second intermediate value; VCT2 or VCT12, between the second peak value VP2 and the first peak value VP1. Then, the peak detecting unit 142 calculates and sets up a second judgment level (threshold); JVL2 or JVL12, by adding or subtracting the second correction value; α2 or α12 to/from the second intermediate value; VCT2 or VCT12 between the second peak value VP2 and the first peak value VP1. Then, the peak detecting unit 142 determines the first peak value, by making sure that a value of a digital signal exceeds the first intermediate value; VCT1 or VCT11, as well as the first judgment level (threshold); JVL1 or JVL11, which has been set up; and exceeds the second intermediate value; VCT2 or VCT12, as well as the second judgment level (threshold); JVL2 or JVL12, which has been set up.

In a reproduced signal (readout signal); as peak values being placed across an intermediate value, there alternately exist a peak value at a maximum (local maximum) value side (peak side) and a peak value at a minimum (local minimum) value side (bottom side). In peak detection with respect to such a signal, the peak detecting unit 142 has a different setup position for the judgment levels; JVL1, JVL2, JVL11, and JVL12, in relation to the intermediate values; VCT1, VCT2, VCT11, and VCT12, depending on whether the first peak value of a determination object is a peak value at the minimum value side (bottom side) or a peak value at the maximum value side (peak side). The peak detecting unit 142 sets up the first judgment level (threshold) JVL1 and the second judgment level (threshold) JVL2 at the maximum value side in relation to the first intermediate value VCT1 and the second intermediate value VCT2, when the first peak value of a determination object is a peak value at the minimum value side (bottom side). In other words, when the first peak value of a determination object is a peak value at the minimum value side (bottom side), the peak detecting unit 142 sets up the first judgment level (threshold) JVL1 and the second judgment level (threshold) JVL2 at the maximum value side in relation to the first intermediate value VCT1 and the second intermediate value VCT2, by adding the first correction value α1 to the first intermediate value VCT1 and adding the second correction value α2 to the second intermediate value VCT2. The peak detecting unit 142 sets up the first judgment level (threshold) JVL11 and the second judgment level (threshold) JVL12 at the minimum value side in relation to the first intermediate value VCT11 and the second intermediate value VCT12, when the first peak value of a determination object is a peak value at the maximum value side (peak side). In other words, when the first peak value of a determination object is a peak value at the maximum value side (peak side), the peak detecting unit 142 sets up the first judgment levels (thresholds) JVL11 and JVL12 at the minimum value side in relation to the first intermediate value VCT11 and the second intermediate value VCT12, by subtracting the first correction value α11 from the first intermediate value VCT11 and subtracting the second correction value α2 from the second intermediate value VCT112.

Figure 3:
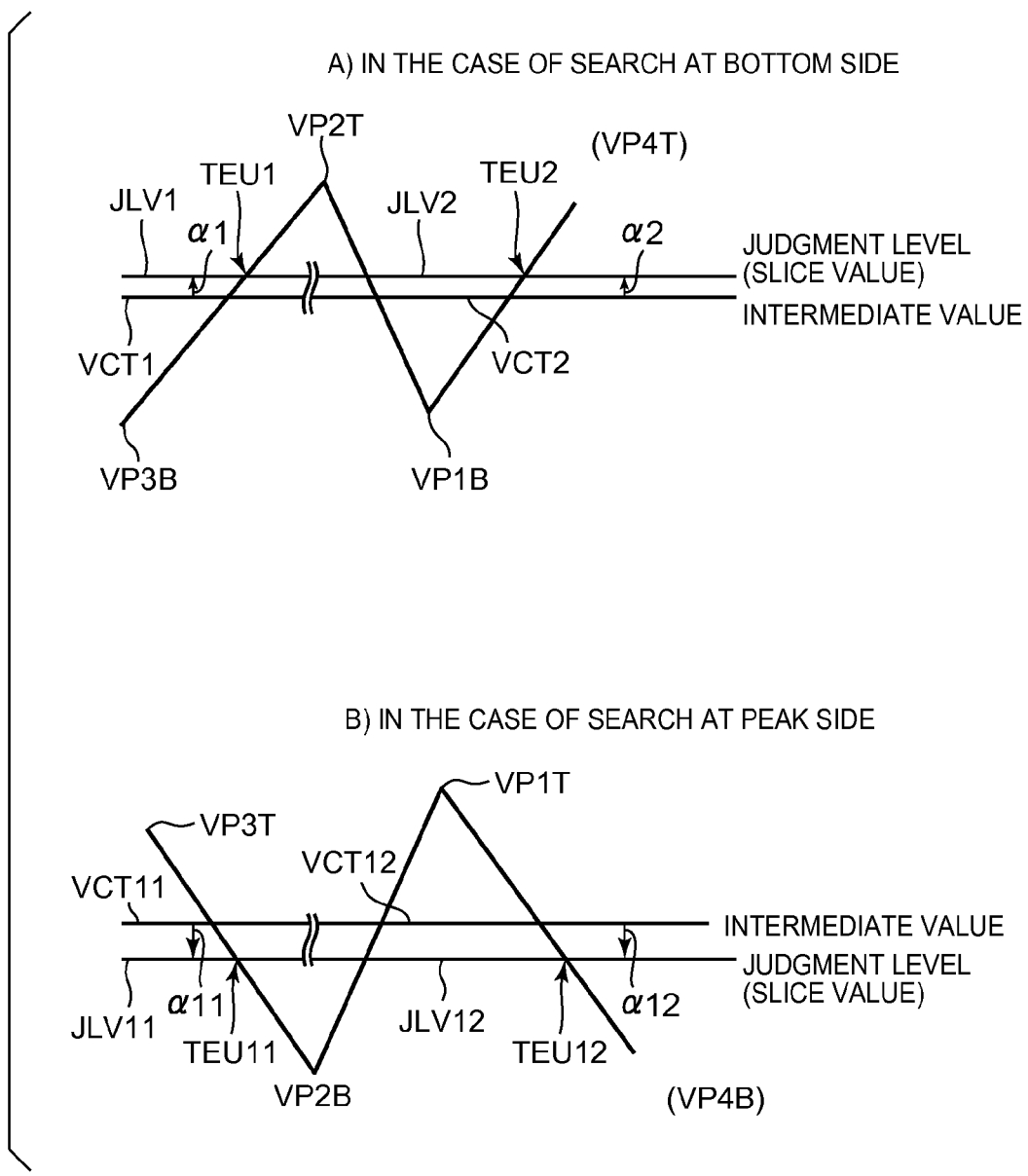
FIG. 3 includes diagrams for explaining a peak detection method that makes a judgment on whether it is a peak value or not, depending on whether two peak points exceed each corresponding threshold (judgment level) or not.

A process of determining the peak value is explained below with reference to FIG. 3A and FIG. 3B. FIG. 3A and FIG. 3B are diagrams for explaining a peak detection method that makes a judgment on whether it is a peak value or not, depending on whether two peak points exceed each corresponding threshold (judgment level) or not. FIG. 3A is a diagram for explaining a peak detection method in the case where the first peak value of a determination object is a peak value at the minimum value side (bottom side), and meanwhile FIG. 3B is a diagram for explaining a peak detection method in the case where the first peak value of a determination object is a peak value at the maximum value side (peak side). Incidentally, for understanding the cases easily, each signal waveform in FIG. 3A and FIG. 3B is shaped as a triangular waveform.

(Peak Detection Method in the Case where the First Peak Value of a Determination Object is a Peak Value at the Minimum Value Side (Bottom Side))

The peak detection method in the case where the first peak value of a determination object is a peak value at the minimum value side (bottom side) is explained at first with reference to FIG. 3A.

In the case where the first peak value VP1B of a determination object is a peak value at the minimum value side, the peak detecting unit 142 uses a second peak value VP2T at the maximum value side, located immediately before the first peak value VP1B, and a third peak value VP3B at the minimum value side, located two peak values before the first peak value VP1B. The peak detecting unit 142 calculates the first correction value α1, by multiplying a difference between the third peak value VP3B and the second peak value VP2T: (VP3B−VP2T) by a predetermined ratio C (=1/2") based on the difference. At the same time in parallel, the peak detecting unit 142 calculates and sets up a first intermediate value VCT1 between the second peak value VP2T and the third peak value VP3B. Then, the peak detecting unit 142 calculates and sets up the first judgment level (threshold) JVL1, by adding the first correction value α1 to the first intermediate value VCT1 between the third peak value VP3B and the second peak value VP2T. The peak detecting unit 142 sets up the first judgment level JVL1, at the maximum value side (peak side) in relation to the first intermediate value VCT1 between the second peak value VP2T and the third peak value VP3B. The peak detecting unit 142 makes a judgment on whether or not a value of a digital signal from the AD converter 141 exceeds the first intermediate value VCT1 and the first judgment level JVL1, which have been set up.

Moreover, the peak detecting unit 142 calculates and sets up the second correction value α2, by multiplying a difference between the second peak value VP2T and the first peak value VP1B: (VP2T−VP1B) by a predetermined ratio C2 (=1/2") based on the difference. At the same time in parallel, the peak detecting unit 142 calculates and sets up a second intermediate value VCT2 between the second peak value VP2T and the first peak value VP1B. Then, the peak detecting unit 142 calculates and sets up the second judgment level (threshold) JVL2, by adding the second correction value α2 to the second intermediate value VCT2 between the second peak value VP2 and the first peak value VP1. The peak detecting unit 142 sets up the second judgment level JVL2, at the maximum value side (peak side) in relation to the second intermediate value VCT2 between the second peak value VP2T and the first peak value VP1B. The peak detecting unit 142 makes a judgment on whether or not the value of the digital signal from the AD converter 141 exceeds the second intermediate value VCT2 and the second judgment level JVL2, which have been set up. Then, the peak detecting unit 142 determines the first peak value VP1B, by making sure that the value of the digital signal exceeds the first intermediate value VCT1 as well as the first judgment level JVL1, which have been set up; and moreover exceeds the second intermediate value VCT2 as well as the second judgment level JVL2, which have been set up.

Making sure that the digital value exceeds the first intermediate value VCT1 as well as the first judgment level JVL1, and making sure that the same exceeds the second intermediate value VCT2 as well as the second judgment level JVL2, may be carried out separately in succession to each setup process, and may also be carried out serially.

The peak detecting unit 142 makes sure whether or not the value of the digital signal discretely changes (increases) from the third peak value VP3B to the second peak value VP2T to exceed the first intermediate value VCT1 and the first judgment level JVL1, as shown in FIG. 3A. Moreover, the value of the digital signal discretely changes (increases) from the first peak value VP1B to a next peak value (VP4T), and at the time TEU2 when the value of the digital signal exceeds the second intermediate value VCT2 and the second judgment level JVL2, the peak detecting unit 142 determines the first peak value VP1B.

(Peak Detection Method in the Case where the First Peak Value of a Determination Object is a Peak Value at the Maximum Value Side (Peak Side))

The peak detection method in the case where the first peak value of a determination object is a peak value at the maximum value side (peak side) is explained next with reference to FIG. 3B.

In the case where the first peak value VP1T of a determination object is a peak value at the maximum value side, the peak detecting unit 142 uses a second peak value VP2B at the minimum value side, located immediately before the first peak value VP1T, and a third peak value VP3T at the maximum value side, located two peak values before the first peak value VP1T. The peak detecting unit 142 calculates the first correction value α11, by multiplying a difference between the third peak value VP3T and the second peak value VP2B: (VP3T−VP2B) by a ratio C11 (=1/2″) based on the difference. At the same time in parallel, the peak detecting unit 142 calculates and sets up a first intermediate value VCT11 between the second peak value VP2B and the third peak value VP3T. Then, the peak detecting unit 142 calculates and sets up the first judgment level (threshold) JVL11, by subtracting the first correction value α11 from the first intermediate value VCT11 between the third peak value VP3T and the second peak value VP2B. The peak detecting unit 142 sets up the first judgment level JVL11, at the minimum value side (bottom side) in relation to the first intermediate value VCT11 between the second peak value VP2B and the third peak value VP3T. The peak detecting unit 142 makes a judgment on whether or not a value of a digital signal from the AD converter 141 exceeds the first intermediate value VCT11 and the first judgment level JVL11, which have been set up.

Moreover, the peak detecting unit 142 calculates the second correction value α12, by multiplying a difference between the second peak value VP2B and the first peak value VP1T: (VP2B−VP1T) by a ratio C12 (=1/2″) based on the difference (an absolute value of the difference). At the same time in parallel, the peak detecting unit 142 calculates and sets up a second intermediate value VCT12 between the second peak value VP2B and the first peak value VP1T. Then, the peak detecting unit 142 calculates and sets up the second judgment level (threshold) JVL12, by subtracting the second correction value α12 from the first intermediate value VCT12 between the second peak value VP2B and the first peak value VP1T. The peak detecting unit 142 sets up the second judgment level JVL12, at the minimum value side (bottom side) in relation to the second intermediate value VCT12 between the second peak value VP2B and the first peak value VP1T. The peak detecting unit 142 makes a judgment on whether or not the value of the digital signal from the AD converter 141 exceeds the second intermediate value VCT12 and the second judgment level JVL12, which have been set up. Then, the peak detecting unit 142 determines the first peak value VP1T, by making sure that the value of the digital signal exceeds the first intermediate value VCT11 as well as the first judgment level JVL11, which have been set up; and moreover exceeds the second intermediate value VCT12 as well as the second judgment level JVL12, which have been set up.

Making sure that the digital value exceeds the first intermediate value VCT11 as well as the first judgment level JVL11, and making sure that the same exceeds the second intermediate value VCT12 as well as the second judgment level JVL12, may be carried out separately to each setup process, and may also be carried out serially.

The peak detecting unit 142 makes sure whether or not the value of the digital signal discretely changes (as the value becomes smaller) from the third peak value VP3T to the second peak value VP2B to exceed the first intermediate value VCT11 and the first judgment level JVL11, as shown in FIG. 3B. Moreover, the value of the digital signal discretely changes (as the value becomes smaller) from the first peak value VP1T to a next peak value (VP4B), and at the time TEU12 when the value of the digital signal exceeds the second intermediate value VCT12 and the second judgment level JVL12, the peak detecting unit 142 determines the first peak value VP1T.

The peak detecting unit 142 is explained above in detail. Explained next are a concrete configuration and a concrete function of the data demodulation device 143.

(Configuration and Function of the Data Demodulation Device)

As shown in FIG. 1, the data demodulation device 143 is configured in such a way as to include: a preliminary data creating unit 1431 that creates a plurality of preliminary data rows, according to the obtained information of intervals, for creating demodulated data; and a demodulated data creating unit 1432 that creates the demodulated data according to first individual data which form the created plurality of preliminary data rows. In this context, the preliminary data rows are data rows including the first individual data to be identified on the basis of the intervals, and the data rows are formed of the first individual data of plural bits.

Figure 4:
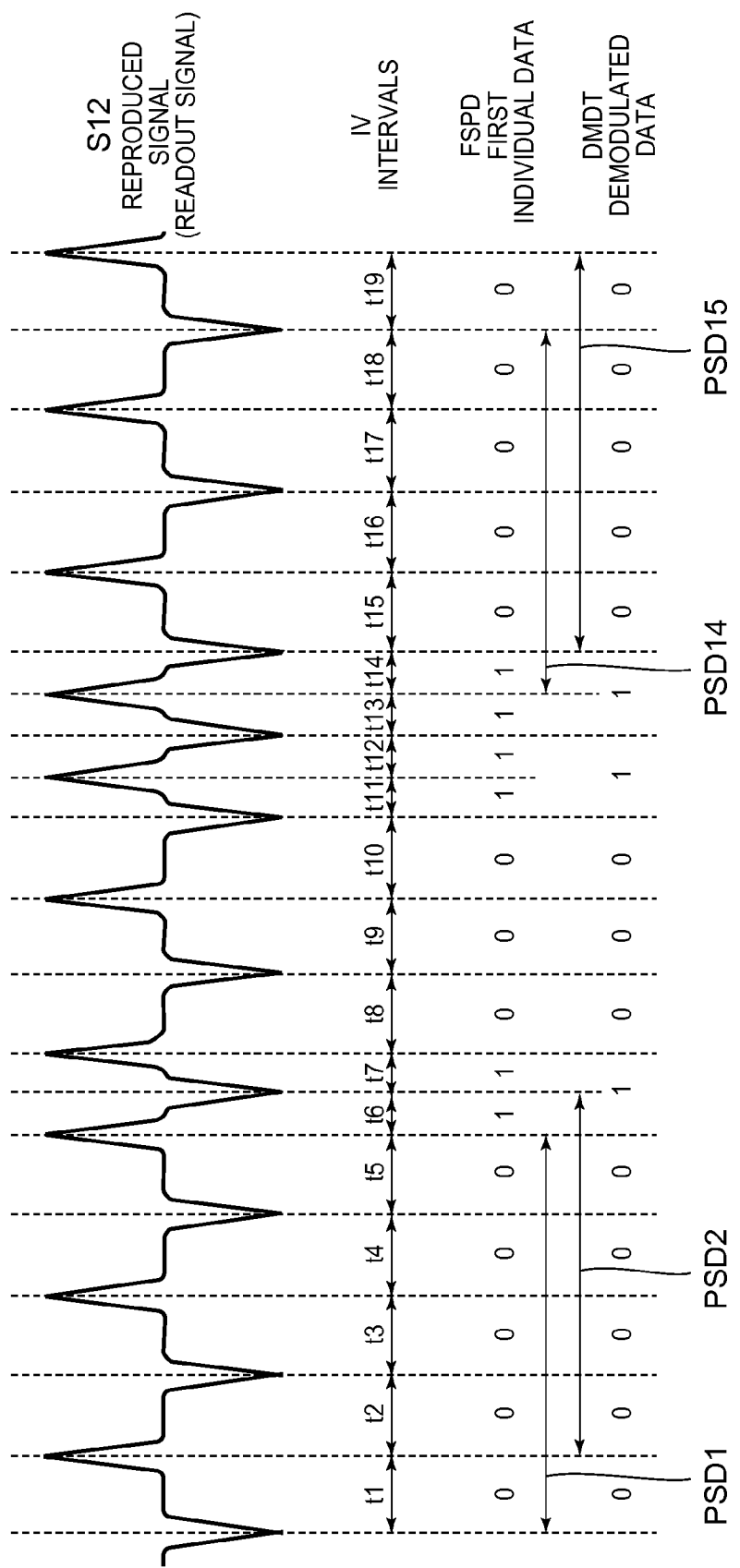
FIG. 4 is a drawing for explaining an outline of demodulated data creating procedures in a data demodulation unit according to the present embodiment.

FIG. 4 is a drawing for explaining an outline of demodulated data creating procedures in a data demodulation device according to the present embodiment. Incidentally, for convenience of explanation, FIG. 4 shows an example of a waveform of a reproduced signal (readout signal) in the case where the magnetic card MC is transferred at a constant speed. FIG. 5 is a diagram for explaining a plurality of preliminary data rows created in a preliminary data creating unit in the data demodulation unit according to the present embodiment.

The preliminary data creating unit 1431 creates a plurality of preliminary data rows PDSs for creating the demodulated data, according to intervals t1 through t19, each of which is information on a time interval between peaks in a reproduced signal (readout signal) S12 of magnetic data that have been detected in the peak detecting unit 142 and output from the magnetic head 11. In the present embodiment, the preliminary data rows PDSs include first individual data FSPDs that are "0" & "1" data identified according to the intervals t1 through t19, and the preliminary data rows PDSs are, for example, formed of the first individual data FSPDs being continuous 5-bit data.

As described later, in the present embodiment, a preliminary data row PDS is created each time when a peak is detected in the reproduced signal (readout signal) S12. With respect to a range of the reproduced signal (readout signal) S12 shown in FIG. 4, the preliminary data creating unit 1431 creates 15 preliminary data rows, i.e., from a preliminary data row PDS1 to a preliminary data row PDS15, as shown in FIG. 5.

Relationships between the preliminary data row PDS1 through the preliminary data row PDS15, shown in FIG. 5, and the intervals t1 through t19 and the first individual data FSPDs, shown in FIG. 4, are as described below.

The preliminary data row PDS1 is formed of a 5-bit first individual datum FSPD (0 0 0 0 0) corresponding to continuous five intervals t1 through t5. The preliminary data row PDS2 is formed of a 5-bit first individual datum FSPD (0 0 0 0 1) corresponding to continuous five intervals t2 through t6, wherein the preliminary data row PDS2 being displaced one interval in relation to the preliminary data row PDS1. The preliminary data row PDS3 is formed of a 5-bit first individual datum FSPD (0 0 0 1 1) corresponding to continuous five intervals t3 through t7, wherein the preliminary data row PDS3 being displaced one interval in relation to the preliminary data row PDS2. The preliminary data row PDS4 is formed of a 5-bit first individual datum FSPD (0 0 1 1 0) corresponding to continuous five intervals t4 through t8, wherein the preliminary data row PDS4 being displaced one interval in relation to the preliminary data row PDS3. The preliminary data row PDS5 is formed of a 5-bit first individual datum FSPD (0 1 1 0 0) corresponding to continuous five intervals t5 through t9, wherein the preliminary data row PDS5 being displaced one interval in relation to the preliminary data row PDS4.

The preliminary data row PDS6 is formed of a 5-bit first individual datum FSPD (1 1 0 0 0) corresponding to continuous five intervals t6 through t10, wherein the preliminary data row PDS6 being displaced one interval in relation to the preliminary data row PDS5. The preliminary data row PDS7 is formed of a 5-bit first individual datum FSPD (1 0 0 0 1) corresponding to continuous five intervals t7 through t11, wherein the preliminary data row PDS7 being displaced one interval in relation to the preliminary data row PDS6. The preliminary data row PDS8 is formed of a 5-bit first individual datum FSPD (0 0 0 1 1) corresponding to continuous five intervals t8 through t12, wherein the preliminary data row PDS8 being displaced one interval in relation to the preliminary data row PDS7. The preliminary data row PDS9 is formed of a 5-bit first individual datum FSPD (0 0 1 1 1) corresponding to continuous five intervals t9 through t13, wherein the preliminary data row PDS9 being displaced one interval in relation to the preliminary data row PDS8. The preliminary data row PDS10 is formed of a 5-bit first individual datum FSPD (0 1 1 1 1) corresponding to continuous five intervals t10 through t14, wherein the preliminary data row PDS10 being displaced one interval in relation to the preliminary data row PDS9.

The preliminary data row PDS11 is formed of a 5-bit first individual datum FSPD (1 1 1 1 0) corresponding to continuous five intervals t11 through t15, wherein the preliminary data row PDS11 being displaced one interval in relation to the preliminary data row PDS10. The preliminary data row PDS12 is formed of a 5-bit first individual datum FSPD (1 1 1 0 0) corresponding to continuous five intervals t12 through t16, wherein the preliminary data row PDS12 being displaced one interval in relation to the preliminary data row PDS11. The preliminary data row PDS13 is formed of a 5-bit first individual datum FSPD (1 1 0 0 0) corresponding to continuous five intervals t13 through t17, wherein the preliminary data row PDS13 being displaced one interval in relation to the preliminary data row PDS12. The preliminary data row PDS14 is formed of a 5-bit first individual datum FSPD (1 0 0 0 0) corresponding to continuous five intervals t14 through t18, wherein the preliminary data row PDS14 being displaced one interval in relation to the preliminary data row PDS13. The preliminary data row PDS15 is formed of a 5-bit first individual datum FSPD (0 0 0 0 0) corresponding to continuous five intervals t15 through t19, wherein the preliminary data row PDS15 being displaced one interval in relation to the preliminary data row PDS14.

A method of creating a preliminary data row in the preliminary data creating unit 1431 is described later in detail.

The demodulated data creating unit 1432 creates the demodulated data, according to a first individual datum that constitutes a preliminary data row PDS. As shown in FIG. 4, in the present embodiment; a "0" datum in a first individual datum FSPD, as it is, becomes a "0" datum in demodulated data DMDT; and in the meantime, two consecutive "1" data in the first individual datum FSPD become a "1" datum in the demodulated data DMDT. Therefore, in the present embodiment, odd numbers of "1" data of the first individual data FSPD(1) are never given (never exist) between "0" data of the first individual data FSPD(0).

(Configuration Example of the Preliminary Data Creating Unit)

Figure 6:
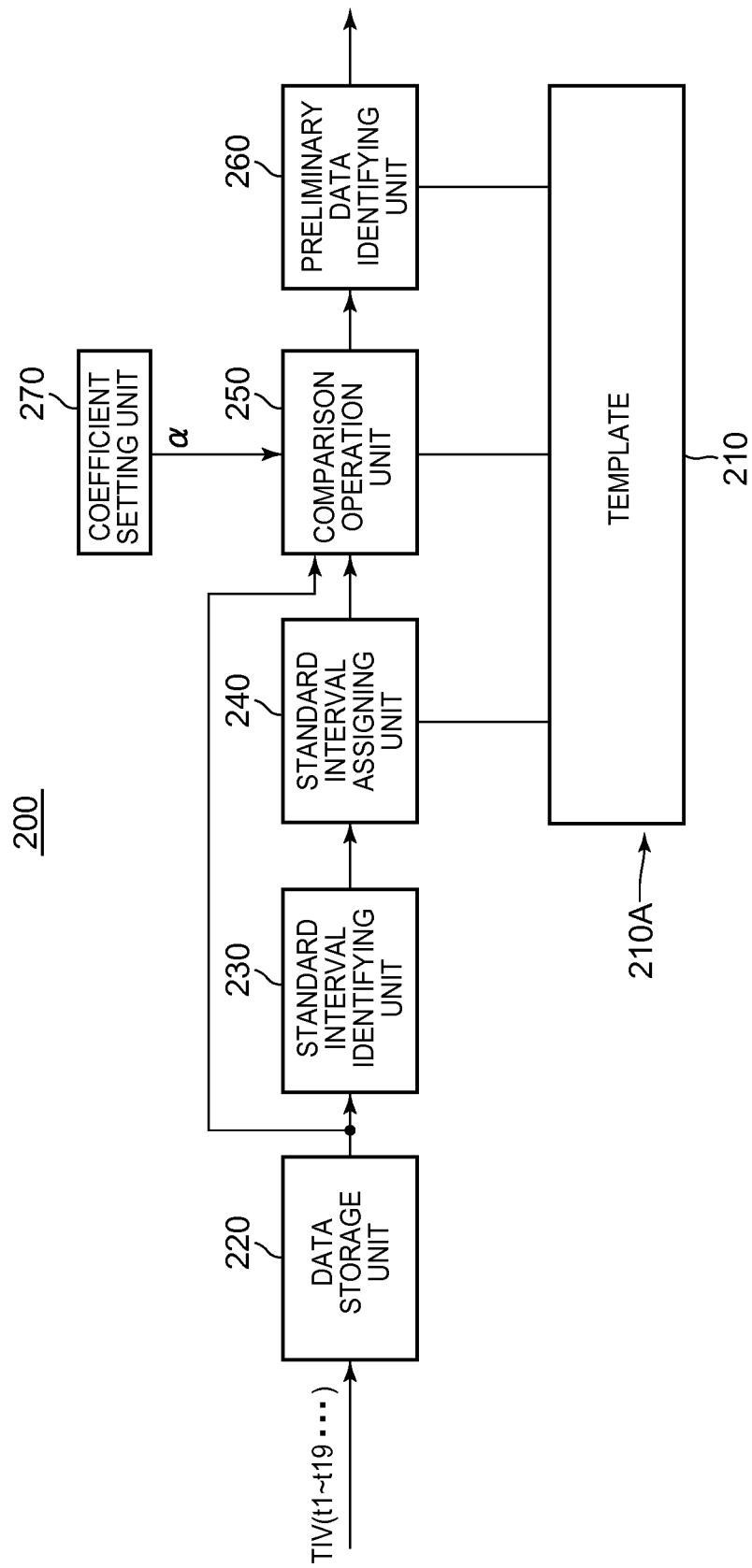
FIG. 6 is a block diagram showing a configuration example of a preliminary data creating unit according to the present embodiment.

A concrete configuration example of the preliminary data creating unit 1431 is explained next. FIG. 6 is a block diagram showing a configuration example of a preliminary data creating unit according to the present embodiment. Incidentally, the preliminary data creating unit is represented with a reference numeral '200' in FIG. 6.

The preliminary data creating unit 200 shown in FIG. 6 is configured in such a way as to include a template 210 formed in a memory unit 210A such as a memory, a data storage unit 220, a standard interval identifying unit 230, a standard interval assigning unit 240, a comparison operation unit 250, a preliminary data identifying unit 260, and a coefficient setting unit 270.

The template 210 is stored in the memory unit 210A, wherein part of (or all of) a plurality of bit patterns BPTs (32 bit patterns in the case of 5-bit patterns) are listed in the template 210, the bit patterns BPTs being formed of second individual data SSPD having the same number of multiple-bit as the number of multiple-bit (5-bit data in this case) that first individual data, forming the preliminary data rows PDSs, have.

FIG. 7 is a diagram for explaining a template saved in the preliminary data creating unit according to the present embodiment. FIG. 8 is a diagram showing 5-bit bit patterns.

In the template 210 according to the present embodiment, 13 bit patterns selected out of 32 bit patterns PTN0 through PTN31, which are conceived as 5-bit bit patterns, are listed (applied) as bit patterns BPT1 through BPT13, as shown in FIG. 7 and FIG. 8.

The bit pattern PTN0 of FIG. 8 is applied as the bit pattern BPT1 of the template 210 of FIG. 7. The bit pattern BPT1 is formed of a 5-bit second individual datum SSPD1 (0 0 0 0 0). The bit pattern PTN24 of FIG. 8 is applied as the bit pattern BPT2 of the template 210 of FIG. 7. The bit pattern BPT2 is formed of a 5-bit second individual datum SSPD2 (1 1 0 0 0). The bit pattern PTN12 of FIG. 8 is applied as the bit pattern BPT3 of the template 210 of FIG. 7. The bit pattern BPT3 is formed of a 5-bit second individual datum SSPD3 (0 1 1 0 0). The bit pattern PTN6 of FIG. 8 is applied as the bit pattern BPT4 of the template 210 of FIG. 7. The bit pattern BPT4 is formed of a 5-bit second individual datum SSPD4 (0 0 1 1 0). The bit pattern PTN30 of FIG. 8 is applied as the bit pattern BPT5 of the template 210 of FIG. 7. The bit pattern BPT5 is formed of a 5-bit second individual datum SSPD5 (1 1 1 1 0).

The bit pattern PTN1 of FIG. 8 is applied as the bit pattern BPT6 of the template 210 of FIG. 7. The bit pattern BPT6 is formed of a 5-bit second individual datum SSPD6 (0 0 0 0 1). The bit pattern PTN25 of FIG. 8 is applied as the bit pattern BPT7 of the template 210 of FIG. 7. The bit pattern BPT7 is formed of a 5-bit second individual datum SSPD7 (1 1 0 0 1). The bit pattern PTN13 of FIG. 8 is applied as the bit pattern BPT8 of the template 210 of FIG. 7. The bit pattern BPT8 is formed of a 5-bit second individual datum SSPD8 (0 1 1 0 1). The bit pattern PTN3 of FIG. 8 is applied as the bit pattern BPT9 of the template 210 of FIG. 7. The bit pattern BPT9 is formed of a 5-bit second individual datum SSPD9 (0 0 0 1 1).

The bit pattern PTN27 of FIG. 8 is applied as the bit pattern BPT10 of the template 210 of FIG. 7. The bit pattern BPT10 is formed of a 5-bit second individual datum SSPD10 (1 1 0 1 1). The bit pattern PTN7 of FIG. 8 is applied as the bit pattern BPT11 of the template 210 of FIG. 7. The bit pattern BPT11 is formed of a 5-bit second individual datum SSPD11 (0 0 1 1 1). The bit pattern PTN15 of FIG. 8 is applied as the bit pattern BPT12 of the template 210 of FIG. 7. The bit pattern BPT12 is formed of a 5-bit second individual datum SSPD12 (0 1 1 1 1). The bit pattern PTN31 of FIG. 8 is applied as the bit pattern BPT13 of the template 210 of FIG. 7. The bit pattern BPT13 is formed of a 5-bit second individual datum SSPD13 (1 1 1 1 1).

Incidentally, as described above, odd numbers of "1" data of the first individual data are never given between "0" data of the first individual data. Therefore, no bit pattern having odd numbers of "1" data placed between "0" data is listed (applied) in the template 210 stored in the preliminary data creating unit 200. In this regard, there are 12 bit patterns having odd numbers of "1" data placed between "0" data. Concretely to describe, those 12 bit patterns are; the bit pattern PTN2 (0 0 0 1 0), the bit pattern PTN4 (0 0 1 0 0), the bit pattern PTN5 (0 0 1 0 1), the bit pattern PTN8 (0 1 0 0 0), the bit pattern PTN9 (0 1 0 0 1), the bit pattern PTN10 (0 1 0 1 0), the bit pattern PTN11 (0 1 0 1 1), the bit pattern PTN14 (0 1 1 1 0), the bit pattern PTN18 (1 0 0 1 0), the bit pattern PTN20 (1 0 1 0 0), the bit pattern PTN21 (1 0 1 0 1), and the bit pattern PTN26 (1 1 0 1 0), shown in FIG. 8.

Moreover, in the template 210, a standard interval RIV is assigned to each of second individual data SSPDs of the bit patterns BPT1 through BPT13. In the template 210, a first standard interval FRIV is assigned if a second individual datum SSPD is "0," and a second standard interval SRIV is assigned if a second individual datum SSPD is "1." In this context, the first standard interval FRIV is an interval as a standard for making a judgment that a first individual data FSPD of a preliminary data row PDS is "0." Meanwhile, the second standard interval SRIV is an interval as a standard for making a judgment that a first individual data is "1."

The data storage unit 220 sequentially stores the intervals t1 through t19 that are continuously supplied from the peak detecting unit 142. Information stored in the data storage unit 220 is referred to by the standard interval identifying unit 230 and the comparison operation unit 250.

FIG. 9 is a diagram for explaining storage status of intervals stored in the data storage unit of the preliminary data creating unit according to the present embodiment.

Each time when the peak detecting unit 142 detects a peak in the reproduced signal (readout signal), an interval as information on a time interval between peaks is sequentially measured and stored in the data storage unit 220. In an example shown in FIG. 9, the data storage unit 220 has local data storage units 220-(0) through 220-(9), being separated into 10 sections. In the data storage unit 220, a latest interval is stored in the local data storage unit 220-(9). As the latest interval is stored in the local data storage unit 200-(9), intervals having been stored in a local data storage unit 220-(N) (wherein, 'N' is an integer in a range from 1 to 9) are now stored in a local data storage unit 220-(N−1). In other words, intervals 't1' to 't19' stored in the local data storage unit 220-(9) are sequentially shifted in such a way; from the local data storage unit 220-(9) to the local data storage unit 220-(8), - - - , from the local data storage unit 220-(1) to the local data storage unit 220-(0), as shown in FIG. 9, each time when a peak is detected in the reproduced signal (readout signal).

In the present embodiment, intervals stored in the local data storage units 200-(9) to 200-(5) are intervals for judgment DTMIVs in order to create a 5-bit preliminary data row PDS by means of identifying a first individual data FSPD. The intervals for judgment DTMIVs are intervals, as measured data Tn, that have been measured just at the exact moment. Then, an absolute value of a difference between the intervals for judgment DTMIVs as the measured data Tn and either the first standard interval FRIV or the second standard interval SRIV is calculated as explained later.

In the explanation below, the intervals for judgment stored in the local data storage unit 220-(5) are intervals for judgment DTMIV1, the intervals for judgment stored in the local data storage unit 220-(6) are intervals for judgment DTMIV2, the intervals for judgment stored in the data storage unit 220-(7) are intervals for judgment DTMIV3, the intervals for judgment stored in the data storage unit 220-(8) are intervals for judgment DTMIV4, and the intervals for judgment stored in the data storage unit 220-(9) are intervals for judgment DTMIV5. The first individual data FSPD are identified according to the intervals for judgment DTMIV5 through DTMIV1 stored in the local data storage units 220-(9) through 220-(5), so as to create a 5-bit preliminary data row PDS. For example, as shown in FIG. 9, a 5-bit preliminary data row PDS5 is created according to the intervals 't9' through 't5' corresponding to the intervals for judgment DTMIV5 through DTMIV1 stored in the local data storage units 220-(9) through 220-5). Otherwise, a 5-bit preliminary data row PDS6 is created according to the intervals 't10' through 't6' corresponding to the intervals for judgment DTMIV5 through DTMIV1 stored in the local data storage units 220-(9) through 220-(5).

In the meantime, intervals stored in the local data storage units 220-(4) through 220-(1) are intervals for calculation in order to calculate a standard interval RIV for judging whether each of the first individual data FSPD constituting a preliminary data row PDS is "0" or "1." The standard intervals RIVs (the first standard interval FRIV and the second standard interval SRIV) are calculated according to the intervals for calculation stored in the local data storage units 220-(4) through 220-(1), as described later. In the explanation below, the intervals for calculation stored in the local data storage unit 220-(4) are intervals for calculation CALIN4, the intervals for calculation stored in the local data storage unit 220-(3) are intervals for calculation CALIV3, the intervals for calculation stored in the local data storage unit 220-(2) are intervals for calculation CALIV2, and the intervals for calculation stored in the local data storage unit 220-(1) are intervals for calculation CALIV1.

Meanwhile, an interval stored in the local data storage unit 220-(0) is an interval for eliminating an influence of noise. If a latest interval stored in the local data storage unit 220-(9) is less than a certain value, and eventually it is assumed that a noise peak has been detected, a sum of the latest intervals stored in the local data storage unit 220-(9) and the intervals stored in the local data storage unit 220-(8) is stored in the local data storage unit 220-(9); and then, intervals having been stored in a local data storage unit 220-(m−1) (wherein, 'm' is an integer in a range from 1 to 7) are now stored in a local data storage unit (m). Namely, in this case, the sum of the latest intervals stored in the local data storage unit 220-(9) and the intervals stored in the local data storage unit 220-(8) is stored in the local data storage unit 220-(9), and the intervals stored in the local data storage unit 220-(0) through the local data storage unit 220-(8) are sequentially shifted in such a way; from the local data storage unit 220-(0) to the local data storage unit 220-(1), - - - , from the local data storage unit 200-(7) to the local data storage unit 220-(8).

According to the plurality of intervals that are entered from the peak detecting unit 142 and stored in the data storage unit 220, the standard interval identifying unit 230 identifies the first standard interval FRIV and the second standard interval SRIV; the first standard interval FRIV being an interval as a standard for making a judgment that a first individual datum FSPD of a preliminary data row PDS is "0", and the second standard interval SRIV being an interval as a standard for making a judgment that a first individual datum FSPD is "1." As described above, the standard interval identifying unit 230 calculates and identifies the standard intervals RIVs (the first standard interval FRIV and the second standard interval SRIV), according to a data pattern of a first individual datum FSPD corresponding to the intervals for calculation CALIV4 through CALIV1, stored in the local data storage units 220-(4) through 220-(1) of the data storage unit 220. For example, the standard interval identifying unit 230 calculates an average value of at least two out of the four intervals for calculation CALIV4 through CALIV1, according to the data pattern of the first individual datum FSPD corresponding to the intervals for calculation CALIV4 through CALIV1, in order to make the first standard interval FRIV with the calculated average, and then identifies half a value of the first standard interval FRIV as the second standard interval SRIV.

FIG. 10 is a diagram for explaining a method of identifying a standard interval in a standard interval identifying unit according to the present embodiment.

As a pattern 'A' shows in FIG. 10, if both first individual data FSPD4 and FSPD3 judged according to the intervals for calculation CALIV4 and CALIV3 are "0", an average value of the intervals for calculation CALIV4 and CALIV3 is identified as a first standard interval FRIV that is a standard for judging the first individual data to be "0". Then, half a value of the identified first standard interval FRIV is identified as a second standard interval SRIV that is a standard for judging the first individual data FSPD to be "1". Namely, in the case of the pattern 'A', values calculated by use of formulas (1) mentioned below are identified as the first standard interval FRIV and the second standard interval SRIV.

$$FRIV(\text{the first standard interval})=(CALIV4+CALIV3)/2$$

$$SRIV(\text{the second standard interval})=FRIV/2 \quad \text{(Expression 2)}$$

As a pattern 'B' shows in FIG. 10; in the case where a first individual datum FSPD4 judged according to the intervals for calculation CALIV4 is "0" and a first individual datum FSPD3 judged according to the intervals for calculation CALIV3 is "1"; odd numbers of "1" data of the first individual data never exist between "0" data of the first individual data, as described above, so that it is assumed that a first individual datum FSPD2 judged according to the intervals for calculation CALIV2 is "1". Therefore, values calculated by use of formulas mentioned below are identified as the first standard interval FRIV and the second standard interval SRIV.

$$FRIV=(CALIV4+CALIV3+CALIV2)/2$$

$$SRIV=FRIV/2 \quad \text{(Expression 3)}$$

As a pattern 'C' shows in FIG. 10; in the case where a first individual datum FSPD4 judged according to the intervals for calculation CALIV4 is "1" and a first individual datum FSPD3 judged according to the intervals for calculation CALIV3 is "0" and a first individual datum FSPD2 judged according to the intervals for calculation CALIV2 is "0"; values calculated by use of formulas mentioned below are identified as the first standard interval FRIV and the second standard interval SRIV.

$$FRIV=(CALIV3+CALIV2)/2$$

$$SRIV=FRIV/2 \quad \text{(Expression 4)}$$

As a pattern 'D' shows in FIG. 10; in the case where a first individual datum FSPD4 judged according to the intervals for calculation ACLIV4 is "1" and a first individual datum FSPD3 judged according to the intervals for calculation CALIV3 is "0" and a first individual datum FSPD2 judged according to the intervals for calculation CALIV2 is "1"; it is assumed that a first individual datum FSPD1 judged according to the intervals for calculation CALIV1 is "1". Therefore, values calculated by use of formulas mentioned below are identified as the first standard interval FRIV and the second standard interval SRIV.

$$FRIV=(CALIV3+CALIV2+CALIV1)/2$$

$$SRIV=FRIV/2 \quad \text{(Expression 5)}$$

As a pattern 'E' shows in FIG. 10; in the case where a first individual datum FSPD4 judged according to the intervals for calculation CALIV4 is "1" and a first individual datum FSPD3 judged according to the intervals for calculation CALIV3 is "1" and a first individual datum FSPD2 judged according to the intervals for calculation CALIV2 is "1" and a first individual datum FSPD1 judged according to the intervals for calculation CALIV1 is "0"; values calculated by use of formulas mentioned below are identified as the first standard interval FRIV and the second standard interval SRIV.

$$FRIV=(CALIV3+CALIV2+CALIV1)/2$$

$$SRIV=FRIV/2 \quad \text{(Expression 6)}$$

As a pattern 'F' shows in FIG. 10; in the case where first individual data FSPD4 through FSPD1 judged according to the intervals for calculation CALIV4 through CALIV1 are all "1", values calculated by use of formulas mentioned below are identified as the first standard interval FRIV and the second standard interval SRIV.

$$FRIV=(CALIV4+CALIV3+CALIV2+CALIV1)/2$$

$$SRIV=FRIV/2 \quad \text{(Expression 7)}$$

As a pattern 'G' shows in FIG. 10; in the case where a first individual datum FSPD4 judged according to the intervals for calculation CALIV4 is "1" and a first individual datum FSPD3 judged according to the intervals for calculation CALIV3 is "1" and a first individual datum FSPD2 judged according to the intervals for calculation CALIV2 is "0"; values calculated by use of formulas mentioned below are identified as the first standard interval FRIV and the second standard interval SRIV.

$$FRIV=(CALIV4+CALIV3+CALIV2)/2$$

$$SRIV=FRIV/2 \quad \text{(Expression 8)}$$

The standard interval assigning unit 240 makes an assignment to each of second individual data SSPDs in the template 210; namely, it assigns the first standard interval FRIV to a second individual datum SSPD being "0", and assigns the second standard interval SRIV to a second individual datum SSPD being "1."

The template 210 shown in FIG. 6 is an example, in which a first standard interval FRIV calculated and identified as 681 (μsec) by the standard interval identifying unit 230 is assigned to a second individual datum SSPD being a datum "0." In the template 210 shown in FIG. 6, in the same manner, a second standard interval SRIV calculated and identified as 340.5 (μsec) by the standard interval identifying unit 230 is assigned to a second individual datum SSPD being a datum "1."

The comparison operation unit 250 makes a comparison between a plurality of intervals for judgment DTMIV as intervals for identifying a first individual datum FSPD and either of a first standard interval FRIV or a second standard interval SRIV, assigned in the template 210, with respect to each bit pattern BPT as well as each bit of the bit pattern BPT.

As described above, the intervals for judgment DTMIV are intervals, as measured data Tn, that have been measured just at the exact moment. The template 210 of FIG. 7 as an example shows that; a first interval for judgment DTMIV1 is 441 (μsec), a second interval for judgment DTMIV2 is 278 (μsec), a third interval for judgment DTMIV3 is 338 (μsec), a fourth interval for judgment DTMIV4 is 631 (μsec), and a fifth interval for judgment DTMIV5 is 637 (μ see).

In the comparison process described above, the comparison operation unit 250 concretely calculates a first absolute value ABV1 as a first positive value of a difference between an interval for judgment DTMIV and a first standard interval FRIV assigned in the template, or a second absolute value ABV2 as a second positive value of a difference between an interval for judgment DTMIV and a second standard interval assigned in the template, with respect to each bit pattern BPT as well as each bit of the bit pattern BPT. Then, the comparison operation unit 250 of the present embodiment carries out a process described next, in order to prevent a judgment error from arising in an identifying process of the preliminary data identifying unit 260, for materialization of further accurate magnetic data demodulation. The comparison operation unit 250 multiplies the second absolute value ABV2 of the difference between the second standard interval SRIV and the interval for judgment DTMIV, by a weighting coefficient β which is a greater value than that for the first absolute value ABV1 so as to obtain a second correction value AMV2 as a result of correcting the second absolute value ABV2, as well as a first correction value AMV1 as a result of correcting the first absolute value ABV1 (including a value as a result of multiplying by 1 as well (namely a configuration with no multiplication by use of a coefficient)).

In the present embodiment, with respect to the multiplication process on the absolute values by the coefficients βs in the comparison operation unit 250, the coefficients βs are set up in such a way that a coefficient β2, by which the second absolute value ABV2 is multiplied, is comparatively greater than a coefficient β1 by which the first absolute value ABV1 is multiplied. In the present embodiment, the comparison operation unit 250 multiplies the second absolute value ABV2, out of the first absolute value ABV1 and the second absolute value ABV2, by a coefficient that is greater than 1, as formulas shown below represent. In the formulas shown below; Tn, T0, and T1 represent a measured datum, a first standard interval for a datum "0", and a second standard interval for a datum "1", respectively. In other words, relationships of 'Tn=DTMIV (interval for judgment) under the conditions', 'T0=FRIV', and 'T1=SRIV' are fulfilled under the conditions.

$$AMV2=ABV2*\beta2=|DTMIV-SRIV|*\beta2=|Tn-T1|*\beta2$$

$$AMV1=ABV1*\beta1=|DTMIV-FRIV|*\beta1=|Tn-T0|*\beta1 \quad \text{(Expression 9)}$$

Wherein, it is preferable that β2 is greater than 1 and smaller than 2 so as to fulfill a relationship of '1<β2<2', and β2 is 1.5 on the basis of experiments and the like. In the meantime, the coefficient β1 is smaller than 1, for example, β1=1 in the present embodiment.

As a general rule; in the case where the coefficient β2, by which the second absolute value ABV2 of a difference between the interval for judgment Tn (DTMIV) and the second standard interval T1 (SRIV) is multiplied, is in relation of '1<β2<2', the coefficient β1, by which the absolute value ABV1 of a difference between the interval for judgment Tn (DTMIV) and the first standard interval T0 (FRIV) is multiplied, is in relation of 'β1=1/β2.'

In the present example, as preferred setup conditions with respect to the coefficients β2 and β1, β2=1.5 and β1=1 are specified. Therefore, since the first absolute value ABV1 is multiplied by 1, essentially no multiplier is needed in such a way as to produce an advantage of an arithmetic process being simplified and a circuit configuration being also simplified. Alternatively, the coefficients β2 and β1 may also be specified in relation of 'β=2, meanwhile β2=3', in such a way that, for example, the coefficient β2 is a value greater than the β1, and the coefficient β2 is 1.5 times greater the coefficient β1 as described in the present example. In this case, a multiplier is also needed at a side of the first absolute value.

In the present embodiment, the comparison operation unit 250 multiplies the second absolute value, out of the first absolute value and the second absolute value, by the coefficient that is greater than that for the first absolute value, in order to prevent a judgment error from arising in the identifying process of the preliminary data identifying unit 260, for materialization of further accurate magnetic data demodulation. In paragraphs below, an advantage of multiplying by a coefficient is explained in comparison with another case of not multiplying by a coefficient.

Generally, in demodulation of magnetically-recorded data, a datum is demodulated by way of providing "0" and "1" for a data portion where a bit interval time period exceeds about 70% of a specified period, and another data portion where a bit interval time period does not exceed the above percentage, respectively. Incidentally, if a difference from the specified time period is simply used according to this predetermined method, a data portion where a bit interval time period is, for example, 72% of the specified time period may be unfortunately judged so as to be close to "1" as described below as an example.

In this case example, a measured datum Tn, as an interval for judgment, corresponds to 72 (Tn=72). Then, a datum "1" is one half of a datum "0", and therefore a standard datum as the second standard interval T1 (SRIV) is set to be 50 (T1=50) and meanwhile a standard datum as the first standard interval (FRIV) is set to be 100 (T0=100). At this time, a comparison with the datum "1" and another comparison with the datum "0" are made as described below.

Comparison with the datum "1":|72−50|=22

Comparison with the datum "0":|72−100|=28 (Expression 10)

In this case, an absolute value of a difference between the standard datum and the measured datum taken in is calculated, and a comparison result having a smaller similarity coefficient is selected in accordance with a rule. Therefore, though the measured datum "72" should be judged to be a datum "0", a misjudgment is made by selecting a datum "1" having a smaller similarity coefficient.

In the meantime, according to the present embodiment as described above, at the time when a difference between the measured datum Tn (the interval for judgment: DTMIV) and either the standard datum T0 (the first standard interval FRIV) or the standard datum T1 (the second standard interval SRIV)

is calculated, the difference is not calculated in a simple manner, but each of the absolute values of the differences or one of those two absolute values (T1 side) is multiplied by a weighting coefficient β, as described below, so as to prevent an above-mentioned judgment error from arising.

Comparison with the datum "1": $|Tn-T1|*\beta2$

Comparison with the datum "0": $|Tn-T0|*\beta1$ (Expression 11)

As described above, β2 and β1 are specified with a value '1.5' and a value '1' in the present embodiment as a preferred case example, respectively. If the formulas mentioned above are set with β2=1.5 (β1=1), the same effect is exerted as setting a threshold at the time of the bit interval time period being 70% of the specified period. A case example, in which actual values are assigned to the above formulas provided with the coefficients β, is described below.

For example, in the case where a data portion should be judged to be a datum "0" while the bit interval time period being 71% of the specified period, calculations are made as described below.

Comparison with the datum "1": $|71-50|*1.5=31.5$

Comparison with the datum "0": $|71-100|=29$ (Expression 12)

Since a comparison result having a smaller similarity coefficient is selected in accordance with the rule, the absolute value "29" is selected in this case, out of the absolute values of the differences; i.e., "31.5" and "29." In other words, by means of the method according to the present embodiment, the measured datum "71" should be judged to be a datum "0", and a datum "0" having a smaller similarity coefficient is so selected as to make a right judgment.

Moreover, for example, in the case where a data portion should be judged to be a datum "1" while the bit interval time period being 69% of the specified period, calculations are made as described below.

Comparison with the datum "1": $|69-50|*1.5=28.5$

Comparison with the datum "0": $|69-100|=31$ (Expression 13)

Since a comparison result having a smaller similarity coefficient is selected in accordance with the rule, the absolute value "28.5" is selected in this case, out of the absolute values of the differences; i.e., "28.5" and "31." In other words, by means of the method according to the present embodiment, the measured datum "69" should be judged to be a datum "1", and a datum "1" having a smaller similarity coefficient is so selected as to make a right judgment.

Incidentally, for example, in the case where the similarity coefficients are the same, the bit interval time period being 70% of the specified period leads to a judgment with a datum "0." Moreover, since a measured datum (interval for judgment) exceeding a standard value (a standard datum) results in a large similarity coefficient, a datum smaller than 50 or larger than 100 may be dealt with as having a difference of '0'. For example, in the case of a measured datum (interval for judgment) being 120; although an absolute value of a difference, i.e., |120−100| primarily becomes '20', a datum "0" is already identified so that a difference of '0' is given. Thus, a judgment process can be carried out, excluding data that may possibly become noise, and therefore judgment accuracy can be improved. Otherwise, in the case of a datum that exceeds a value of a standard datum, the value is not discarded but may be multiplied moreover by a coefficient γ in order to correct the value for having it within a range of the standard value, and make use of the value for a judgment. Thus, further more data can be used for the judgment, and accordingly judgment accuracy can be improved in this case as well.

Moreover, although explained above as an example is a case where the weighting coefficient β2 is constantly fixed to be 1.5, the coefficient may not be fixed to be 1.5 but may be changed in accordance with conditions so as to materialize an optimal demodulation process. In an example shown in FIG. 6, the coefficient setting unit 270 is configured with a register and the like, and the coefficient setting unit 270 is so configured as to become able to arbitrarily specify a coefficient value. A coefficient β specified by the coefficient setting unit 270 is then supplied to the comparison operation unit 250.

Figure 11:
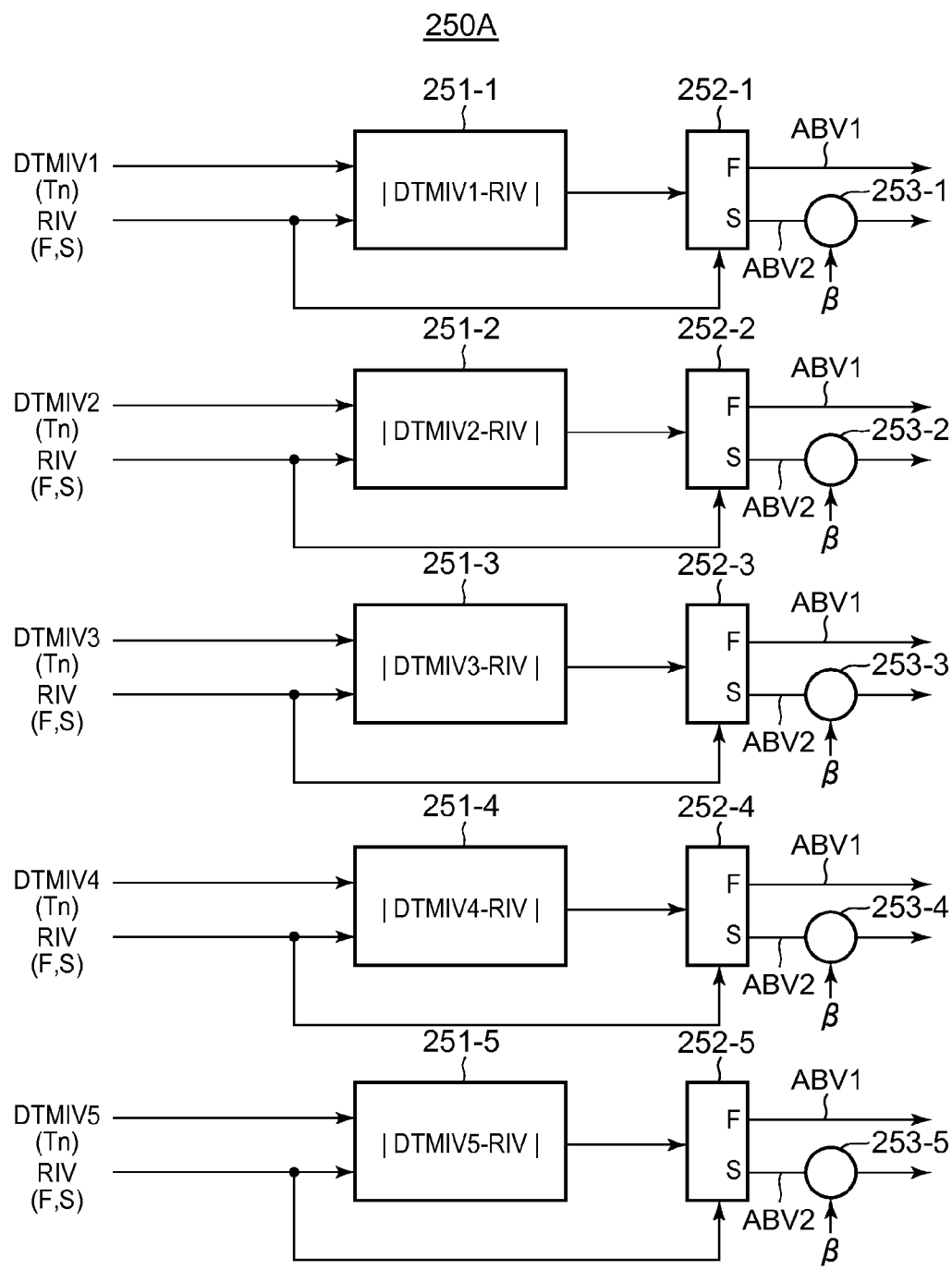
FIG. 11 is a block diagram showing a configuration example of substantial sections in a comparison operation unit according to the present embodiment.

FIG. 11 is a block diagram showing a configuration example of substantial sections in a comparative operation unit according to the present embodiment.

A comparison operation unit 250A is configured in such a way as to include difference absolute value calculation units 251-1 through 251-5, selectors 252-1 through 252-5, and multiplier 253-1 through 253-5.

The comparison operation unit 250A shown in FIG. 11 is a configuration example in which the second absolute value ABV2 as a difference between the interval for judgment DTMIV and the second standard interval SRIV is multiplied by a coefficient β (for example, 1.5), and meanwhile the first absolute value ABV1 as a difference between the interval for judgment DTMIV and the first standard interval FRIV is not multiplied by a coefficient (to multiply by 1).

The comparison operation unit 250A is so configured as to become able to calculate a difference absolute value between a standard interval assigned to each of the 5-bit second individual data SSPD and each of the five intervals for judgment DTMIV corresponding to each datum, in parallel. Incidentally in an example shown in FIG. 11, for example, the first standard interval (F)RIV and the second standard interval (S)RIV are provided with information that indicates whether it is a first standard interval or a second standard interval, and the selectors 252-1 through 252-5 use the information as select information. The select information is configured, for example, with one bit, and it is formed in such a way as to show that a select bit SB being a logical "0" means the first standard interval (F)RIV and a select bit SB being a logical "1" means the second standard interval (S)RIV. Nevertheless, the above is just one case example, and it is also possible to configure the unit in such a way that select information is supplied from a control system, not shown, which recognizes whether it is a first standard interval FRIV or a second standard interval SRIV for each bit of a bit pattern; and various modes can be applied.

An example of a calculation process by the comparison operation unit 250A shown in FIG. 11 is explained below with reference to the template 210 shown in FIG. 7.

A process is carried out for the bit pattern BPT1 as described below:

An interval for judgment DTMIV1 (=441 μsec) and a first standard interval FRIV (=681 μsec) of a second individual datum SSPD1 corresponding to the above interval for judgment are supplied to the difference absolute value calculation unit 251-1. Then, the difference absolute value calculation unit 251-1 calculates |DTMIV1−FRIV|=|441−681|, and a result of the calculation "240" is input into the selector 252-1. In this case, since it is a difference absolute value calculation with respect to a first standard interval FRIV, an output F side is selected in the selector 252-1. Then, without being multiplied by a coefficient, the calculation result "240" is output to the template 210 and the preliminary data identifying unit 260.

An interval for judgment DTMIV2 (=278 μsec) and a first standard interval FRIV (=681 μsec) of a second individual datum SSPD1 corresponding to the above interval for judgment are supplied to the difference absolute value calculation unit 251-2. Then, the difference absolute value calculation unit 251-2 calculates |DTMIV2−FRIV|=|278−681|, and a result of the calculation "403" is input into the selector 252-2. In this case, since it is a difference absolute value calculation with respect to a first standard interval FRIV, an output F side is selected in the selector 252-2. Then, without being multiplied by a coefficient, the calculation result "403" is output to the template 210 and the preliminary data identifying unit 260.

An interval for judgment DTMIV3 (=338 μsec) and a first standard interval FRIV (=681 μsec) of a second individual datum SSPD1 corresponding to the above interval for judgment are supplied to the difference absolute value calculation unit 251-3. Then, the difference absolute value calculation unit 251-3 calculates |DTMIV3−FRIV|=|338−681|, and a result of the calculation "343" is input into the selector 252-3. In this case, since it is a difference absolute value calculation with respect to a first standard interval FRIV, an output F side is selected in the selector 252-3. Then, without being multiplied by a coefficient, the calculation result "343" is output to the template 210 and the preliminary data identifying unit 260.

An interval for judgment DTMIV4 (=631 μsec) and a first standard interval FRIV (=681 μsec) of a second individual datum SSPD1 corresponding to the above interval for judgment are supplied to the difference absolute value calculation unit 251-4. Then, the difference absolute value calculation unit 251-4 calculates |DTMIV4−FRIV|=|631−681|, and a result of the calculation "50" is input into the selector 252-4. In this case, since it is a difference absolute value calculation with respect to a first standard interval FRIV, an output F side is selected in the selector 252-4. Then, without being multiplied by a coefficient, the calculation result "50" is output to the template 210 and the preliminary data identifying unit 260.

An interval for judgment DTMIV5 (=637 μsec) and a first standard interval FRIV (=681 μsec) of a second individual datum SSPD1 corresponding to the above interval for judgment are supplied to the difference absolute value calculation unit 251-5. Then, the difference absolute value calculation unit 251-5 calculates |DTMIV5−FRIV|=|637−681|, and a result of the calculation "44" is input into the selector 252-5. In this case, since it is a difference absolute value calculation with respect to a first standard interval FRIV, an output F side is selected in the selector 252-5. Then, without being multiplied by a coefficient, the calculation result "44" is output to the template 210 and the preliminary data identifying unit 260.

Thus, for the bit pattern BPT1, the difference absolute value is not multiplied by a coefficient in the template 210 shown in FIG. 7.

A process is carried out for the bit pattern BPT2 as described below:

An interval for judgment DTMIV1 (=441 μsec) and a second standard interval SRIV (=340.5 μsec) of a second individual datum SSPD1 corresponding to the above interval for judgment are supplied to the difference absolute value calculation unit 251-1. Then, the difference absolute value calculation unit 251-1 calculates | DTMIV1−SRIV|=|441−340.5|, and a result of the calculation "100.5" is input into the selector 252-1. In this case, since it is a difference absolute value calculation with respect to a second standard interval SRIV, an output S side is selected in the selector 252-1. Then, the multiplier 253-1 multiplies the calculation result "100.5" by a coefficient β, and the multiplied calculation result is output to the template 210 and the preliminary data identifying unit 260.

An interval for judgment DTMIV2 (=278 μsec) and a second standard interval SRIV (=340.5 μsec) of a second individual datum SSPD1 corresponding to the above interval for judgment are supplied to the difference absolute value calculation unit 251-2. Then, the difference absolute value calculation unit 251-2 calculates |DTMIV2−SRIV|=|278−340.5|, and a result of the calculation "62.5" is input into the selector 252-2. In this case, since it is a difference absolute value calculation with respect to a second standard interval SRIV, an output S side is selected in the selector 252-2. Then, the multiplier 253-1 multiplies the calculation result "62.5" by a coefficient β, and the multiplied calculation result is output to the template 210 and the preliminary data identifying unit 260.

An interval for judgment DTMIV3 (=338 μsec) and a first standard interval FRIV (=681 μsec) of a second individual datum SSPD1 corresponding to the above interval for judgment are supplied to the difference absolute value calculation unit 251-3. Then, the difference absolute value calculation unit 251-3 calculates |DTMIV3−FRIV|=|338−681|, and a result of the calculation "343" is input into the selector 252-3. In this case, since it is a difference absolute value calculation with respect to a first standard interval FRIV, an output F side is selected in the selector 252-3. Then, without being multiplied by a coefficient, the calculation result "343" is output to the template 210 and the preliminary data identifying unit 260.

An interval for judgment DTMIV4 (=631 μsec) and a first standard interval FRIV (=681 μsec) of a second individual datum SSPD1 corresponding to the above interval for judgment are supplied to the difference absolute value calculation unit 251-4. Then, the difference absolute value calculation unit 251-4 calculates |DTMIV4−FRIV|=|631−681|, and a result of the calculation "50" is input into the selector 252-4. In this case, since it is a difference absolute value calculation with respect to a first standard interval FRIV, an output F side is selected in the selector 252-4. Then, without being multiplied by a coefficient, the calculation result "50" is output to the template 210 and the preliminary data identifying unit 260.

An interval for judgment DTMIV5 (=637 μsec) and a first standard interval FRIV (=681 μsec) of a second individual datum SSPD1 corresponding to the above interval for judgment are supplied to the difference absolute value calculation unit 251-5. Then, the difference absolute value calculation unit 251-5 calculates |DTMIV5−FRIV|=|637−681|, and a result of the calculation "44" is input into the selector 252-5. In this case, since it is a difference absolute value calculation with respect to a first standard interval FRIV, an output F side is selected in the selector 252-5. Then, without being multiplied by a coefficient, the calculation result "44" is output to the template 210 and the preliminary data identifying unit 260.

Thus, for the bit pattern BPT2 in the template 210 shown in FIG. 7, the difference absolute value is multiplied by a coefficient with respect to some bits, and not multiplied by a coefficient with respect to other bits.

For the bit patterns BPT3 through BPT13 as well in the template 210, the same process is carried out as done for the bit patterns BPT1 and BPT2 described above. A detailed explanation of the process is omitted here.

The preliminary data identifying unit 260 identifies a bit pattern BPT corresponding to a preliminary data row PDS, according to a comparison result by the comparison operation unit 250, and then outputs the identified bit pattern BPT, as a preliminary data row, to the demodulated data creating unit 1432. The preliminary data identifying unit 260 calculates, a sum value Σ, which is a sum of a first absolute value ABV1 and/or a second absolute value ABV2 of each bit pattern BPT, wherein the first absolute value ABV1 and the second absolute value ABV2 are calculated for each bit in the comparison operation unit 250 and these values are those after the multiplication by a coefficient; and then the preliminary data identifying unit 260 identifies a bit pattern BPT that gives a minimum of the calculated sum value Σ, as a preliminary data row.

In an example with respect to the template 210 shown in FIG. 7; a sum value Σ1 of difference absolute values of a bit pattern BPT1 is '1080', a sum value Σ2 of difference absolute values of a bit pattern BPT2 is '681.5', a sum value Σ3 of difference absolute values of a bit pattern BPT3 is '431.5', a sum value Σ4 of difference absolute values of a bit pattern BPT4 is '1126.5', a sum value Σ5 of difference absolute values of a bit pattern BPT5 is '728', a sum value Σ6 of difference absolute values of a bit pattern BPT6 is '1480.75', a sum value Σ7 of difference absolute values of a bit pattern BPT7 is '1082.25'. Furthermore, a sum value Σ8 of difference absolute values of a bit pattern BPT8 is '832.25', a sum value Σ9 of difference absolute values of a bit pattern BPT9 is '1866.5', a sum value Σ10 of difference absolute values of a bit pattern BPT10 is '1468', a sum value Σ11 of difference absolute values of a bit pattern BPT11 is '1527.25', a sum value Σ12 of difference absolute values of a bit pattern BPT12 is '1218', a sum value Σ13 of difference absolute values of a bit pattern BPT13 is '1128.75'. In this example, the sum value Σ3 (431.5) of difference absolute values of the bit pattern BPT3 is a minimum value, and therefore the preliminary data identifying unit 260 identifies the bit pattern PTN3 (0 1 1 0 0) as a preliminary data row.

(Operation of Magnetically Recorded Data Reproduction Device)

Figure 12:
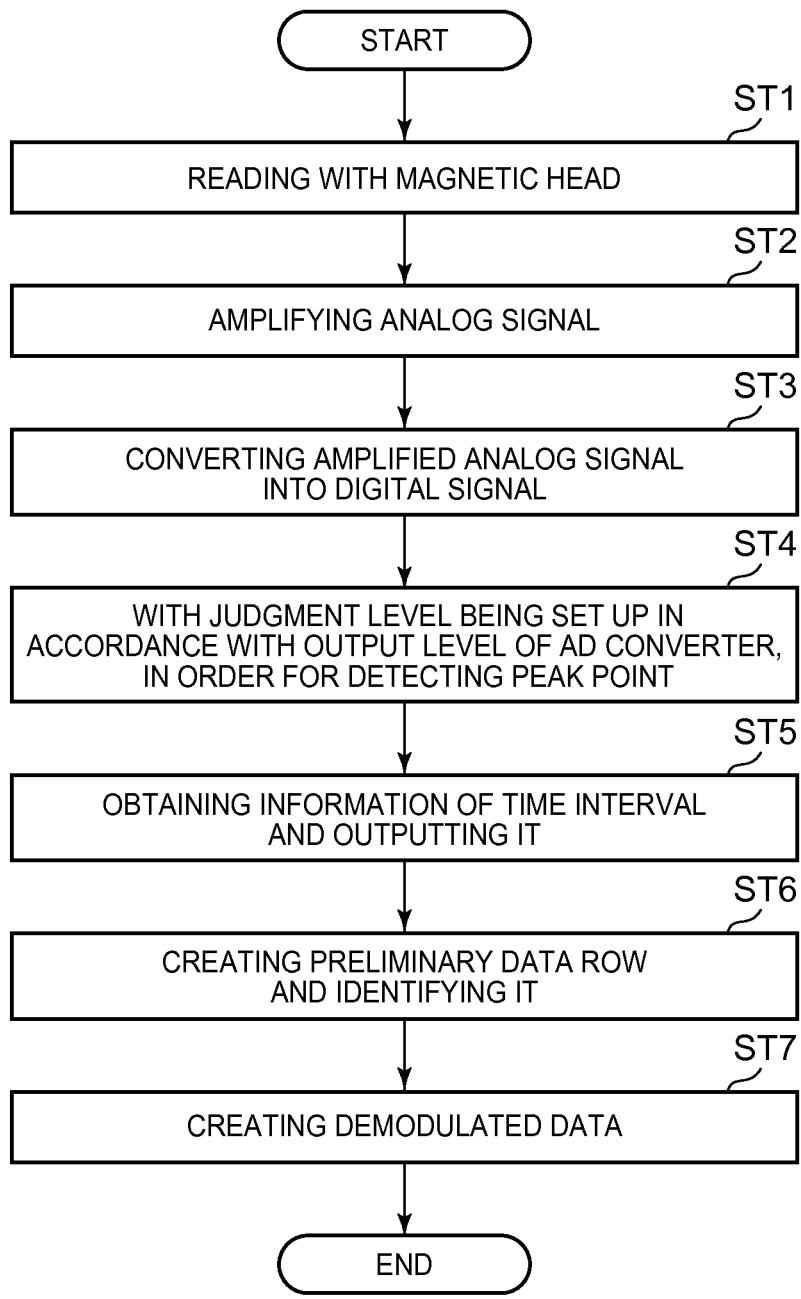
FIG. 12 is a flowchart for explaining an outline of general operation of the magnetically recorded data reproduction device according to the present embodiment.
Figure 13:
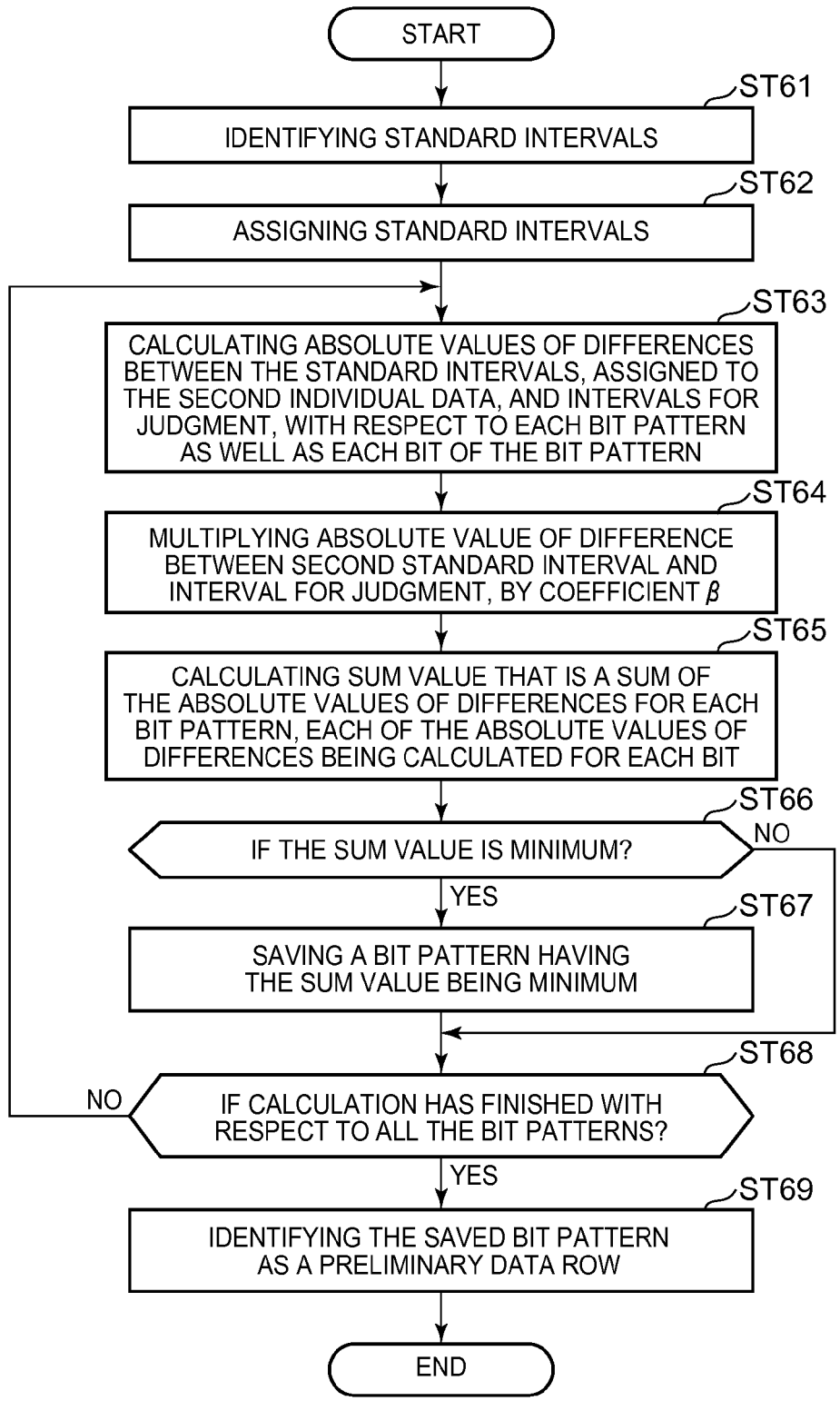
FIG. 13 is a flowchart for explaining an operation of creating a preliminary data row in the preliminary data creating unit according to the present embodiment.

Next, a general operation of the magnetically recorded data reproduction device 10 having the configuration described above is explained with reference to flow charts of FIG. 12 and FIG. 13. FIG. 12 is a flowchart for explaining an outline of general operation of the magnetically recorded data reproduction device according to the present embodiment. FIG. 13 is a flowchart for explaining an operation of creating a preliminary data row in the preliminary data creating unit according to the present embodiment.

As FIG. 12 shows, by way of moving a magnetic card and the like relative to the magnetic head (HD) 11, the magnetic head 11 outputs the analog signal S11 (Step ST1), and then the analog signal S11 is amplified to an appropriate value (level) by the differential amplifier circuit 12 with an operation amplifier (Op. Amp) (Step ST2). The amplified analog signal S12 is input into the AD converter 141, and then converted into a digital signal by the AD converter 141 (Step ST3). The digital signal converted by the AD converter 141 is output as the signal S141 to the peak detecting unit 142. At the time, the digital signal; including positional (time-wise) information created according to the sampling numbers SPLN and each sampling point value such as SV(n+1), - - -, (n+4), - - -; is output from the AD converter 141 to the peak detecting unit 142, wherein the positional information and the sampling point values being associated with the sampling operation.

In the peak detecting unit 142, the output digital signal S141 is received from the AD converter 141, and detected there is the peak point corresponding to a position of an extreme value (a local maximum value and a local minimum value) in magnetic data (Step ST4). In the peak detecting unit 142, the detection threshold as a judgment level for a waveform at the time of peak detection is automatically set up, in accordance with an output level of the AD converter 141. In this way, it is possible to deal with even a magnetic card having a fluctuated output, without switching over a circuit. In the peak detecting unit 142, the magnetic data converted into digital data is judged at first by using the initial judgment level (threshold), and it is judged to be a peak if the magnetic data exceeds the judgment level. A next judgment level is calculated by using the previous peak value. Concretely to describe, a digital value of a peak (Max) minus a digital value of a bottom (Min) in a waveform leaves a value; PtoP=Max−Min; and the value PtoP multiplied by a certain ratio 'C', for example; (=1/2″), is calculated as a value (correction value, or level) α. Then, adding the correction value α or subtracting the correction value α to/from an intermediate value VCT, between the digital value (Max) and the digital value (Min), leaves a value (level) as a judgment level JLV, which is automatically set up. Then, information of a time interval (gap) TIV between peak points calculated according to a plurality of peak-point information sets is obtained in the peak detecting unit 142, and the signal S142 including the intervals 't1' through 't19' - - - (TIV) is output to the data demodulation device 143 (Step ST5), and then a process of creating a preliminary data row is carried out (Step ST6).

In the data demodulation device 143, information of the intervals 't1' through 't19' - - - , which has been input, is sequentially stored into the data storage unit 220 of the preliminary data creating unit 200 (1431). If the number of the intervals 't1' through 't19' stored in the data storage unit 220 of the preliminary data creating unit 200 reaches '7' or more, creating a preliminary data row starts each time when peaks of a readout signal are detected and a latest interval is stored in the data storage unit 220-(9).

If once creating a preliminary data row starts, at first the preliminary data creating unit 200 identifies a standard interval for judging whether each of the first individual data FSPD constituting the preliminary data row is "0" or "1" (Step S61), as shown in FIG. 13.

For example, if a case of creating an 'n-th' preliminary data row PDS is exemplified, it is judged in the present embodiment whether each of the first individual data FSPD in relation to the intervals for calculation CALIB4 through CALIB1 is "0" or "1", in a course of creating preliminary data rows up to an '(n−1)-th' preliminary data row, according to the intervals for calculation CALIB4 through CALIB1, stored in the data storage units 220-(4) through 220-(1). At Step S61, the standard interval identifying unit 230 of the preliminary data creating unit 200 calculates standard intervals FRIV and SRIV, on the basis of the first individual data FSPD, each of which has been judged to be either "0" or "1" according to the intervals for calculation CALIB4 through CALIB1; and then updates the standard intervals by using the calculated standard intervals as new standard intervals. In other words, the standard interval identifying unit 230 identifies the newly calculated standard intervals as the standard intervals for creating the 'n-th' preliminary data row.

On the basis of the plurality of intervals that are input from the peak detecting unit 142 and stored in the data storage unit 220, the standard interval identifying unit 230 identifies; the first standard interval FRIV that is a standard interval for judging the first individual data FSPD of the preliminary data row PDS to be "0", and the second standard interval SRIV that is a standard interval for judging the first individual data FSPD to be "1". As described above, the standard interval identifying unit 230 calculates and identifies standard RIVs (the first standard interval FRIV and the second standard interval SRIV) on the basis of a data pattern of the first individual data FSPD in relation to the intervals for calculation CALIB4 through CALIB1, stored in the local data storage units 220-(4) through 220-(1) of the data storage unit 220.

For example, as explained with reference to FIG. 10, the standard interval identifying unit 230 calculates an average or the like of at least two intervals for calculation out of the four intervals for calculation CALIV4 through CALIV1, on the basis of the data pattern of the first individual datum FSPD in relation to the intervals for calculation CALIV4 through CALIV1, in order to make the first standard interval FRIV with the calculated average, and then identifies half a value of the first standard interval FRIV as the second standard interval SRIV. In other words, a selection is made out of the first individual data FSPD1 through FSPD4, in accordance with the pattern A through the pattern G shown in FIG. 10, and an average or the like of the selected data is calculated in order to identify the first standard interval FRIV with the calculated result and to identify the second standard interval SRIV with half a value of the first standard interval FRIV.

After the standard intervals are identified at Step ST61, in the preliminary data creating unit 200, the standard interval assigning unit 240 assigns the standard intervals in the template 210 stored in the memory unit 210A (Step ST62). At Step ST62, the standard interval assigning unit 240 of the preliminary data creating unit 200 makes an assignment to each of second individual data SSPDs forming a bit pattern BPT; namely, it assigns the first standard interval FRIV to a second individual datum SSPD being "0", and assigns the second standard interval to a second individual datum SSPD being "1", in the template 210. For example, in the case where the first standard interval FRIV is 681 (μsec) and the second standard interval SRIV is 340.5 (μsec), the standard interval assigning unit 240 assigns the first standard interval of 681 (μsec) to a second individual datum being "0" and assigns the second standard interval SRIV is 340.5 (μsec) to a second individual datum being "1", as shown in FIG. 7.

Subsequently, in the preliminary data creating unit 200, the comparison operation unit 250 calculates absolute values of differences between either of the first standard interval FRIV or the second standard interval SRIV, which is assigned to the second individual data SSPD forming a bit pattern, and the intervals for judgment DTMIV5 through DTMIV1, with respect to each bit pattern as well as each bit of the bit pattern (Step ST63).

At Step ST63, the comparison operation unit 250 calculates the absolute values of differences between either of the first standard interval FRIV or the second standard interval SRIV, which is assigned to the second individual data SSPD, and the intervals for judgment DTMIV5 through DTMIV1, with respect to each bit of a bit pattern.

For example, at Step ST63, the comparison operation unit 250 makes a calculation to obtain "240", "403", "343", "50", and "44" as the absolute values of differences with respect to the bit pattern BPT1, as shown in FIG. 7. In the meantime, the comparison operation unit 250 makes a calculation to obtain "100.5", "62.5", "343", "50", and "44" as the absolute values of differences with respect to the bit pattern BPT2, as shown in FIG. 7. In the same manner, the comparison operation unit 250 calculates absolute values of differences with respect to the bit patterns BPT3 through BPT13 as well, as shown in FIG. 7.

Then, at the step ST64, the comparison operation unit 250 multiplies an absolute value of a difference between the second standard interval SRIV and the interval for judgment DTMIV (the difference absolute value being a second absolute value ABV2), out of the difference absolute values that have been calculated, by the weighting coefficient β2 (i.e., 1.5 in this case example) in order to calculate a correction value. Since there exists no datum "1" in relation to the bit pattern BPT1, no multiplication by a coefficient is carried out on the difference absolute values. In relation to the bit pattern BPT2, the comparison operation unit 250 multiplies the difference absolute value "100.5" by the coefficient β2 (1.5) to obtain a correction value "150.75", and also multiplies the difference absolute value "62.5" by the coefficient β2 to obtain a correction value "93.75." In relation to the bit pattern BPT3, the comparison operation unit 250 multiplies the difference absolute value "62.5" by the coefficient β2 (1.5) to obtain a correction value "93.75", and also multiplies the difference absolute value "2.5" by the coefficient β2 to obtain a correction value "3.75." Also, in relation to the bit patterns BPT4 through BPT13, the comparison operation unit 250 multiples an absolute value of a difference between the second standard interval SRIV and the interval for judgment DTMIV (a second absolute value ABV2) by the weighting coefficient β2 (1.5) in the same manner in this case example, in order to obtain a correction value.

Next, the preliminary data identifying unit 260 calculates a sum value Σ that is a sum of the first absolute value ABV1 and/or the second absolute value ABV2 with respect to each bit pattern BPT, which the comparison operation unit 250 has calculated for each bit, and for which the multiplication by the coefficient has been conducted (Step ST65). For example, the preliminary data identifying unit 260 calculates a sum value "1080" with respect to the bit pattern BPT1, at Step ST65, as shown in FIG. 7. In this case, calculated is a sum of the first absolute values ABV1s that have not been corrected. Meanwhile, the preliminary data identifying unit 260 calculates a sum value "681.5" with respect to the bit pattern BPT2, as shown in FIG. 7. In this case, calculated is a sum of the first absolute values ABV1s, which have not been corrected, and the second absolute values ABV2s that have been corrected. The same process is carried out hereafter. Then, the preliminary data identifying unit 260 calculates a sum value "1128.75" with respect to the bit pattern BPT13, as shown in FIG. 7. In this case, calculated is a sum of the second absolute values ABV2s that have been corrected.

Subsequently, the preliminary data identifying unit 260 makes a judgment on whether or not the calculated sum value is a minimum value (Step ST66). If the calculated sum value is a minimum value ("YES" at Step ST66), a bit pattern having the sum value being minimum is saved (Step ST67).

Then, the preliminary data identifying unit 260 judges whether or not the calculation of the sum value has finished with respect to all the bit patterns (Step ST68). If it is judged at Step ST68 that the calculation of the sum value has not yet finished with respect to all the bit patterns ("NO" at Step ST68), operation returns to Step ST63. In the meantime, if it is judged at Step ST66 that the calculated sum value is not a minimum value ("NO" at Step ST66), operation progress to Step ST68.

Meanwhile, if the calculation of the sum value has already finished at Step ST68 with respect to all the bit patterns ("YES" at Step ST68), the preliminary data identifying unit 260 identifies the bit pattern saved at Step ST67, as a preliminary data row (Step ST69). For example, as shown in FIG. 7, the sum value being minimum is given as "431.5" of the bit pattern BPT3, and therefore the bit pattern BPT3 is saved in preliminary data creating unit 200 at Step ST69 so that the preliminary data identifying unit 260 identifies a bit pattern (0

1 1 0 0) as a preliminary data row. In other words, the preliminary data identifying unit 260 creates a preliminary data row (0 1 1 0 0) at Step ST69.

At the time of creating a preliminary data row at Step ST69, creating an 'n-th' preliminary data row, for example, finishes. Subsequently, after creating the 'n-th' preliminary data row finishes, latest intervals are stored in the data storage unit 220-(9), and then an '(n+1)-th' preliminary data row is created according to the workflow shown in FIG. 13.

In this way, all preliminary data rows are created to make judgments on "0" & "1" of all first individual data, and then the demodulated data creating unit 1432 creates demodulated data according to the first individual data on which the judgments have been made (Step ST7 shown in FIG. 12).

Intervals for judgment sequentially shift from the intervals for judgment DTMIV5 through DTMIV1, and therefore the judgments on "0" & "1" of the first individual data FSPD in relation to one set of intervals for judgment are made five times in total. In the present embodiment, when the judgments on "0" & "1" of the first individual data FSPD in relation to the intervals for judgment DTMIV1 are made, "0" & "1" status of the first individual data FSPD is finally defined.

(Advantageous Effect of the Present Embodiment)

As explained above, in the data demodulation device 143, the comparison operation unit 250 compares the intervals for judgment DTMIV5 through DTMIV1 with either of the first standard interval FRIV or the second standard interval SRIV, which is assigned in the template 210, with respect to each bit pattern BPT as well as each bit of the bit pattern BPT, according to the present embodiment. Then, on the basis of the comparison result by the comparison operation unit 250, the preliminary data identifying unit 260 identifies a bit pattern in relation to a preliminary data row, and then the identified bit pattern becomes the preliminary data row. In other words, in the present embodiment, the preliminary data row is identified by using five sets of the intervals for judgment DTMIV5 through DTMIV1. Therefore, even in the case where a transfer speed of the magnetic card MC fluctuates on a grand scale, or a recording accuracy of magnetic data recorded in the magnetic card MC is low, it becomes possible to appropriately identify the preliminary data row so that it becomes possible to create appropriate demodulated data out of the plurality of preliminary data rows. Namely, by use of the data demodulation device according to the present embodiment, it becomes possible to appropriately demodulate the magnetic data even though a transfer speed of the magnetic card MC fluctuates on a grand scale, or a recording accuracy of the magnetic data recorded in the magnetic card MC is low.

Especially in the present embodiment, the comparison operation unit 250 calculates the absolute values of differences between the intervals for judgment DTMIV5 through DTMIV1 and either of the first standard interval FRIV or the second standard interval SRIV, which is assigned in the template 210, with respect to each bit pattern BPT as well as each bit of the bit pattern BPT. The comparison operation unit 250 multiplies the second absolute value ABV2 of the difference between the second standard interval SRIV and the interval for judgment DTMIV, by a weighting coefficient $\beta$ which is a greater value than that for the first absolute value ABV1 so as to obtain a second correction value AMV2 as a result of correcting the second absolute value ABV2, as well as a first correction value AMV1 as a result of correcting the first absolute value ABV1 (including a value as a result of multiplying by 1 as well). Then, the preliminary data identifying unit 260 calculates, a sum value $\Sigma$, which is a sum of a first absolute value ABV1 and/or a second absolute value ABV2 of each bit pattern BPT, wherein the first absolute value ABV1 and the second absolute value ABV2 are calculated for each bit in the comparison operation unit 250 and these values are those after the multiplication by a coefficient; and then the preliminary data identifying unit 260 identifies a bit pattern BPT that gives a minimum of the calculated sum value $\Sigma$, as a preliminary data row. Therefore, owing to the process of the comparison operation unit 250 in which the coefficient $\beta$ is applied, it becomes possible to prevent a judgment error from arising in the identifying process of the preliminary data identifying unit 260 and to materialize further accurate magnetic data demodulation.

Furthermore, according to the present embodiment, the standard interval identifying unit 230 calculates and identifies the first standard interval FRIV and the second standard interval SRIV, according to four sets of the intervals for calculation CALIB4 through CALIV1 immediately before five sets of the intervals for judgment DTMIV5 through DTMIV1. Therefore, even in the case where a transfer speed of the magnetic card MC fluctuates on a grand scale, the first standard interval FRIV and the second standard interval SRIV can be identified more appropriately. Accordingly, in the present embodiment, even in the case where a transfer speed of the magnetic card MC fluctuates on a grand scale, it becomes possible to furthermore appropriately demodulate the magnetic data.

Moreover, according to the present embodiment, since a peak detection process of a digital method is applied, an effect described below can be obtained. In peak detection by a conventional analog method, it is necessary to switch over the circuit in order to read out, for example, a noise card as well as a demagnetized card so that a circuit size becomes enlarged and a cost increases. Furthermore, since it is needed to switch over the circuit, trying a plurality of methods is necessary for reading out, and therefore reading time becomes long. On the other hand, in the peak detection of a digital method according to the present embodiment, the threshold of the peak detection can automatically be switched over according to an output level of an analog signal, and therefore it becomes unnecessary to switch over the circuit so that a circuit size becomes smaller and a cost can be reduced. Moreover, since both a noise card as well as a demagnetized card can be dealt with by way of one-time reading, reading time can be shortened.

(Other Configuration Examples of the Data Demodulation Device)

The embodiment and its modification described above are an example of at least an embodiment according to the present invention. Nevertheless, the present invention is not limited to the above embodiment and various variations and modifications may be made without changing the concept of the present invention.

In the embodiment described above, the comparison operation unit 250 calculates absolute values of differences between either of the first standard interval FRIV or the second standard interval SRIV, which is assigned to the second individual data forming a bit pattern, and the intervals for judgment DTMIV5 through DTMIV1, with respect to each bit pattern as well as each bit of the bit pattern.

In another way for example, alternatively a comparison operation unit may be configured in such a way that the comparison operation unit calculates a first square value SQR1 and a second square value SQR2, as the first positive value and the second positive value, respectively; which are square values of differences between either of the first standard interval FRIV or the second standard interval SRIV, being assigned to the second individual data constituting the bit patterns, and the intervals for judgment DTMIV5 through DTMIV1, with respect to each bit pattern as well as each bit of the bit pattern. In this case, the comparison operation unit 250 multiplies the second square value SQR2 of the difference between the second standard interval SRIV and the interval for judgment DTMIV, by a weighting coefficient β which is a greater value than that for the first square value SQR1 so as to obtain a second correction value AMV2 as a result of correcting the second square value SQR2, as well as a first correction value AMV1 as a result of correcting the first absolute value ABV1 (including a value as a result of multiplying by 1 as well). Then, the preliminary data identifying unit 260 calculates, a sum value Σ, which is a sum of the first square value SQR1 and/or the second square value SQR2 of each bit pattern BPT, wherein the first square value SQR1 and the second square value SQR2 are calculated for each bit in the comparison operation unit 250 and these values are those after the multiplication by a coefficient; and then the preliminary data identifying unit 260 identifies a bit pattern BPT that gives a minimum of the calculated sum value Σ, as a preliminary data row. Also in this case, owing to the process of the comparison operation unit 250 in which the coefficient β is applied, it becomes possible to prevent a judgment error from arising in the identifying process of the preliminary data identifying unit 260 and to materialize further accurate magnetic data demodulation.

Furthermore, alternatively the comparison operation unit 250 may calculate deviations between either of the first standard interval FRIV or the second standard interval SRIV, which is assigned to the second individual data forming a bit pattern, and the intervals for judgment DTMIV5 through DTMIV1, with respect to each bit pattern.

In the embodiment described above, the preliminary data row is formed of a 5-bit first individual datum. In another way for example, alternatively the preliminary data row may be formed of a first individual datum of 2-bit through 4-bit; or otherwise may be formed of a first individual datum of 6-bit or greater number-bit. In this case, listed in the template is a bit pattern formed of a second individual datum of the same number-bit as the number-bit of the first individual datum of the preliminary data row. Incidentally, if the preliminary data row is formed of a first individual datum of 3-bit or greater number-bit, it becomes possible to identify the preliminary data row more appropriately even though a transfer speed of the magnetic card MC fluctuates on a grand scale, or a recording accuracy of the magnetic data recorded in the magnetic card MC is low. In the meantime, if the preliminary data row is formed of a first individual datum of 8-bit or smaller number-bit, it becomes possible to prevent a creating process time of the preliminary data row from becoming unnecessarily long.

In the embodiment described above, the standard interval identifying unit 230 calculates the first standard interval and the second standard interval; according to the intervals for calculation for two bits, at a time of a first individual datum corresponding to the intervals for calculation being "0"; or according to the interval for calculation for one bit, at a time of a first individual datum corresponding to the intervals for calculation being "0" and the intervals for calculation for two bits, at a time of a first individual datum corresponding to the intervals for calculation being "1"; or according to the interval for calculation for four bits, at a time of a first individual datum corresponding to the intervals for calculation being "1". In other words, the standard interval identifying unit 230 calculates the first standard interval and the second standard interval; according to the intervals for calculation for two bits at the time of the first individual datum being "0". In another way for example, alternatively the first standard interval and the second standard interval may be calculated according to the interval for calculation for one bit, at the time of the first individual datum being "0", and otherwise the first standard interval and the second standard interval may be calculated according to the intervals for calculation for three bits or more, at the time of the first individual datum being "0".

In the embodiment described above, 13 bit patterns BPT1 through BPT13, out of 32 bit patterns that are conceived as 5-bit bit patterns, are listed in the template 210 stored in the preliminary data creating unit. In another way for example, alternatively, excluding 12 bit patterns in which odd numbers of "1" data are given between "0" data, 20 bit patterns out of 32 bit patterns that are conceived as 5-bit bit patterns may be listed in the template.

Though, the magnetically recorded data reproduction device 10 in the embodiment described above is a manual card reader, alternatively it may be a card reader of a card transfer type, which is equipped with a card transfer mechanism such as a transfer roller and the like. In this case, the first standard interval and the second standard interval may be identified in the same way as they are described in the above embodiment, or otherwise the first standard interval and the second standard interval may be constant values. When the first standard interval and the second standard interval are constant values, the first standard interval and the second standard interval simply need to be assigned in a template beforehand.

In the embodiment described above, magnetic data are recorded in the magnetic card MC by means of an F2F frequency modulation method. Alternatively, as described earlier, magnetic data of the card 2 may be recorded by means of any other magnetic data recording method, such as an F3F frequency modulation method and the like. Furthermore, though the magnetic recording medium in the embodiment described above is the magnetic card MC, alternatively the magnetic recording medium may be any other kind of medium, such as a bankbook and so on.

(Modification Examples of the Digital Reproduction Processing Circuit)

Incidentally, by adding a circuit mentioned below to the digital reproduction processing circuit 14 including the peak detecting unit, the performance can be improved.

At least either of a digital filter 144 and a moving average unit 145 can be placed between an output side of the AD converter 141 and the peak detecting unit 142, as shown with dashed lines in FIG. 1.

(1) For example, by placement of the digital filter 144 at the output side of the AD converter 141, digital data is digital-filtered for de-noising after AD conversion and before peak detection.

(2) For example, by placement of the moving average unit 145 at the output side of the AD converter 141, magnetic data after AD conversion can be moving-averaged in order to smooth the data for de-noising.

(3) For example, by placement of the digital filter 144 and the moving average unit 145 at the output side of the AD converter 141, magnetic data after AD conversion can be digital-filtered, and then subsequently moving-averaged, for de-noising.

Moreover, as described above, an auto gain control (AGC) is carried out for a gain of the differential amplifier circuit 12. In this case, the differential amplifier circuit 12 differentially-amplifies the analog signal S11 reproduced by the magnetic head 11 according to the peak detection information at the peak detecting unit 142 of the digital reproduction processing circuit 14. The differential amplifier circuit 12 carries out the gain control to set up the amplitude of a signal, for example, into a quarter of a full range.

Incidentally, the digital reproduction processing circuit including the peak detecting unit and the data demodulation device can be embedded in an FPGA (Field-Programmable Gate Array) and an ASIC (Application Specific Integrated Circuit).

Second Embodiment

FIG. 14 is a block diagram showing a configuration example of a magnetic record data reproduction device according to a second embodiment of the present invention.

A difference of a magnetically recorded data reproduction device 10A according to this second embodiment, from the magnetically recorded data reproduction device 10 according to the first embodiment, is a point that no data demodulation device (demodulation circuit) is placed in a digital reproduction processing circuit 14A. In the magnetically recorded data reproduction device 10A, a function of the data demodulation device is included at a side of a higher-level device 15A.

Other part of the configuration is the same as that of the first embodiment; and according to this second embodiment, the same effect as the first embodiment described above can be achieved.

Incidentally, the method explained above in detail can be so configured as to be created as a program according to the procedures described above, for being executed by a computer such as a CPU. Then, with the program being stored in a recording medium, such as a semiconductor memory, a magnetic disc, an optical disk, and a Floppy (a registered trademark) disk; the method can be configured in such a way that the computer, in which the recording medium is installed, accesses the program in order to execute the program.

For example, the magnetic data demodulation in the data demodulation device 143 may be implemented by means of either hardware or software. When being compared with implementation of the magnetic data demodulation by means of software, implementation of the magnetic data demodulation by means of hardware enables a demodulation process at a high speed. In the meantime, implementation of the magnetic data demodulation by means of software makes it possible to easily change the number of bits, and the like, in first individual data constituting a preliminary data row, through rewriting a program.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A magnetically recorded data reproduction device for use with a magnetic recording medium, the magnetically recorded data reproduction device comprising:

an analog/digital (A/D) converter structured to convert an analog signal, obtained by reproducing magnetic data recorded in the magnetic recording medium, into a digital signal;

a peak detecting unit structured to detect a peak point of a reproduced signal, from the digital signal, according to a threshold as a judgment level in accordance with an output of the A/D converter; and a data demodulation device structured to demodulate the magnetic data, on the basis of information of intervals according to time intervals of peak points detected by the peak detecting unit;

wherein, the data demodulation device comprises:

a preliminary data creating unit structured to create a plurality of preliminary data rows for creating demodulated data on the basis of an interval corresponding to a time interval between peaks in the reproduced signal of the magnetic data; and a demodulated data creating unit structured to create demodulated data on the basis of first individual data constituting the plurality of preliminary data rows that have been created in the preliminary data creating unit; and the preliminary data rows include the first individual data to be identified on the basis of the interval, and are formed of the first individual data of plural bits, and the preliminary data creating unit comprises;

a template listing part of, or all of, a plurality of bit patterns being formed of second individual data having the same number of multiple-bit as the number of multiple-bit that the first individual data, forming the preliminary data rows, have;

a standard interval identifying unit structured to identify a first standard interval and a second standard interval, the first standard interval being the interval as a standard for making a judgment that the first individual data of the preliminary data rows is "0", and the second standard interval being the interval as a standard for making a judgment that the first individual data is "1", according to information of a plurality of the intervals;

a standard interval assigning unit structured to make an assignment to each of the second individual data in the template; namely, assigning the first standard interval to the second individual datum being "0" and assigning the second standard interval to the second individual datum being "1";

a comparison operation unit structured to make a comparison between a plurality of intervals for judgment as the intervals for identifying the first individual data and either of the first standard interval or the second standard interval, assigned in the template, with respect to each bit pattern as well as each bit of the bit pattern; and a preliminary data identifying unit structured to identify the bit pattern corresponding to the preliminary data rows, according to a comparison result by the comparison operation unit, and outputting the identified bit pattern, as the preliminary data row, to the demodulated data creating unit; and the comparison operation unit calculates a first positive value corresponding to a difference between the intervals for judgment and the first standard interval assigned in the template, or a second positive value corresponding to a difference between the intervals for judgment and the second standard interval, with respect to each bit pattern as well as each bit of the bit pattern, and multiplies the second positive value corresponding to the difference between the second standard interval and the intervals for judgment, by a coefficient which is a greater value than that for the first positive value; and the preliminary data identifying unit calculates a sum value that is a sum of the first positive value and/or the second positive value of each bit pattern, wherein the first positive value and the second positive value are calculated for each bit in the comparison operation unit and these values are those after the multiplication by the coefficient, and then the preliminary data identifying unit identifies the bit pattern that gives a minimum of the calculated sum value, as the preliminary data row.

2. The data demodulation device according to claim 1; wherein, the comparison operation unit multiplies only the second positive value, out of the first positive value and the second positive value, by a coefficient that is greater than 1.

3. The data demodulation device according to claim 1; wherein, if the interval for judgment is positioned in a range beyond a reference value, the comparison operation unit deals with the difference as "0".

4. The data demodulation device according to claim 1; wherein, if the interval for judgment is positioned in a range beyond a reference value, the comparison operation unit multiplies the interval for judgment by a coefficient to make a correction so as to have the interval for judgment within a range of the reference value, and applies the interval for judgment to a judgment process.

5. The data demodulation device according to claim 1; wherein, the data demodulation device comprises a coefficient setting unit that sets up the coefficient and supplies the coefficient, which has been set up, to the comparison operation unit; and
the coefficient to be set up by the coefficient setting unit is changeable.

6. The data demodulation device according to claim 1; wherein, the comparison operation unit calculates a first absolute value as the first positive value of a difference between the interval for judgment and the first standard interval assigned in the template, or a second absolute value as the second positive value of a difference between the interval for judgment and the second standard interval, with respect to each bit pattern as well as each bit of the bit pattern, and multiplies the second absolute value of the difference between the second standard interval and the interval for judgment, by a coefficient which is a greater value than that for the first absolute value; and
the preliminary data identifying unit calculates a sum value that is a sum of the first absolute value and/or the second absolute value of each bit pattern, wherein the first absolute value and the second absolute value are calculated for each bit in the comparison operation unit and these values are those after the multiplication by a coefficient, and then the preliminary data identifying unit identifies the bit pattern that gives a minimum of the calculated sum value, as a preliminary data row.

7. The data demodulation device according to claim 1; wherein, the comparison operation unit calculates a first square value as the first positive value or a second square value as the second positive value, with respect to each bit pattern as well as each bit of the bit pattern, the first square value being a square value of a difference between the interval for judgment and the first standard interval assigned in the template, and the second square value being a square value of a difference between the interval for judgment and the second standard interval, and multiplies the second square value of the difference between the second standard interval and the interval for judgment, by a coefficient which is a greater value than that for the first square value; and
the preliminary data identifying unit calculates a sum value that is a sum of the first square value and/or the second square value of each bit pattern, wherein the first absolute value and the second absolute value are calculated for each bit in the comparison operation unit and these values are those after the multiplication by a coefficient, and then the preliminary data identifying unit identifies the bit pattern that gives a minimum of the calculated sum value, as a preliminary data row.

8. A data demodulation method for demodulating magnetic data, read out and reproduced from a magnetic recording medium, the data demodulation method comprising:
converting an analog signal obtained by reproducing magnetic data recorded in the magnetic recording medium into a digital signal with an analog/digital converter;
detecting a peak point of a reproduced signal from the digital signal according to a threshold as a judgment level in accordance with an output of the A/D converter;
creating a plurality of preliminary data rows for creating demodulated data on the basis of an interval corresponding to a time interval between peaks in the reproduced signal of the magnetic data; and
creating demodulated data on the basis of first individual data constituting the plurality of preliminary data rows that have been created;
wherein, the preliminary data rows include the first individual data to be identified on the basis of the interval, and are formed of the first individual data of plural bits, and
creating a plurality of preliminary data rows uses a template listing part of, or all of, a plurality of bit patterns being formed of second individual data having the same number of multiple-bit as the number of multiple-bit that the first individual data, forming the preliminary data rows, have; and
the creating a plurality of preliminary data rows comprises:
identifying a first standard interval and a second standard interval, the first standard interval being the interval as a standard for making a judgment that the first individual data of the preliminary data rows is "0", and the second standard interval being the interval as a standard for making a judgment that the first individual data is "1", according to information of a plurality of the intervals;
making an assignment to each of the second individual data in the template; namely, assigning the first standard interval to the second individual datum being "0" and assigning the second standard interval to the second individual datum being "1":
making a comparison between a plurality of intervals for judgment as the intervals for identifying the first individual data and either of the first standard interval or the second standard interval, assigned in the template, with respect to each bit pattern as well as each bit of the bit pattern; and
identifying the bit pattern corresponding to the preliminary data rows, according to a comparison result from the comparison between a plurality of intervals, in order to adopt the identified bit pattern as the preliminary data row; and
the making a comparison between a plurality of intervals calculates a first positive value corresponding to a difference between the intervals for judgment and the first standard interval assigned in the template, or a second positive value corresponding to a difference between the intervals for judgment and the second standard interval, with respect to each bit pattern as well as each bit of the bit pattern, and multiplies the second positive value corresponding to the difference between the second standard interval and the intervals for judgment, by a coefficient which is a greater value than that for the first positive value; and the identifying the bit pattern corresponding to the preliminary data rows calculates a sum value that is a sum of the first positive value and/or the second positive value of each bit pattern, wherein the first positive value and the second positive value are calculated for each bit in the comparison operation step and these values are those after the multiplication by the coefficient, and then the identifying the bit pattern corresponding to the preliminary data rows identifies the bit pattern that gives a minimum of the calculated sum value, as the preliminary data row.

9. A computer-readable medium including computer-readable instructions for demodulating magnetic data that is read out and reproduced from a magnetic recording medium that, when executed by a computer, cause the computer to perform:

converting an analog signal obtained by reproducing magnetic data recorded in the magnetic recording medium into a digital signal with an analog/digital converter;

detecting a peak point of a reproduced signal from the digital signal according to a threshold as a judgment level in accordance with an output of the A/D converter;

creating a plurality of preliminary data rows for creating demodulated data on the basis of an interval corresponding to a time interval between peaks in the reproduced signal of the magnetic data; and creating demodulated data on the basis of first individual data constituting the plurality of preliminary data rows that have been created in the preliminary data creating process;

wherein, the preliminary data rows include the first individual data to be identified on the basis of the interval, and are formed of the first individual data of plural bits, and the creating a plurality of preliminary data rows uses a template listing part of, or all of, a plurality of bit patterns being formed of second individual data having the same number of multiple-bit as the number of multiple-bit that the first individual data, forming the preliminary data rows, have; and the creating a plurality of preliminary data rows comprises identifying a first standard interval and a second standard interval, the first standard interval being the interval as a standard for making a judgment that the first individual data of the preliminary data rows is "0", and the second standard interval being the interval as a standard for making a judgment that the first individual data is "1", according to information of a plurality of the intervals;

making an assignment to each of the second individual data in the template; namely, assigning the first standard interval to the second individual datum being "0" and assigning the second standard interval to the second individual datum being "1":

making a comparison between a plurality of intervals for judgment as the intervals for identifying the first individual data and either of the first standard interval or the second standard interval, assigned in the template, with respect to each bit pattern as well as each bit of the bit pattern; and identifying the bit pattern corresponding to the preliminary data rows, according to a comparison result by the comparison operation process, in order to adopt the identified bit pattern as the preliminary data row; and the making a comparison between a plurality of intervals calculates a first positive value corresponding to a difference between the intervals for judgment and the first standard interval assigned in the template, or a second positive value corresponding to a difference between the intervals for judgment and the second standard interval, with respect to each bit pattern as well as each bit of the bit pattern, and multiplies the second positive value corresponding to the difference between the second standard interval and the intervals for judgment, by a coefficient which is a greater value than that for the first positive value; and the identifying the bit pattern corresponding to the preliminary data rows calculates a sum value that is a sum of the first positive value and/or the second positive value of each bit pattern, wherein the first positive value and the second positive value are calculated for each bit in the making comparison between a plurality of intervals and these values are those after the multiplication by the coefficient, and then the preliminary data identifying process identifies the bit pattern that gives a minimum of the calculated sum value, as the preliminary data row.

\* \* \* \* \*